US010382638B2

(12) United States Patent
Naota et al.

(10) Patent No.: US 10,382,638 B2
(45) Date of Patent: Aug. 13, 2019

(54) ELECTRONIC DEVICE, SERVICE EXECUTION SYSTEM, AND LOG ACQUISITION METHOD

(71) Applicant: Kyocera Document Solutions Inc., Osaka (JP)

(72) Inventors: Tomonori Naota, Osaka (JP); Tomihito Doi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/118,479

(22) Filed: Aug. 31, 2018

(65) Prior Publication Data

US 2019/0068817 A1 Feb. 28, 2019

(30) Foreign Application Priority Data

Aug. 31, 2017 (JP) .................................. 2017-166800
Sep. 22, 2017 (JP) .................................. 2017-182588

(51) Int. Cl.
  *H04N 1/04* (2006.01)
  *H04N 1/00* (2006.01)
  *G06F 3/12* (2006.01)

(52) U.S. Cl.
  CPC ....... *H04N 1/00832* (2013.01); *G06F 3/1207* (2013.01); *G06F 3/1273* (2013.01); *H04N 1/00148* (2013.01); *H04N 1/00466* (2013.01)

(58) Field of Classification Search
  CPC ........... H04N 1/00832; H04N 1/00466; H04N 1/00148
  USPC ....................................................... 358/1.13
  See application file for complete search history.

(56) References Cited

U.S. PATENT DOCUMENTS 7,852,502 B2 * 12/2010 Horiyama ............. G06F 3/1273
  358/1.13
8,970,874 B2 * 3/2015 Hiruma ............... G06F 21/6245
  358/1.15

FOREIGN PATENT DOCUMENTS

JP 2002-207399 A 7/2002

* cited by examiner

*Primary Examiner* — Houshang Safaipour
(74) *Attorney, Agent, or Firm* — HEA Law PLLC

(57) ABSTRACT

An electronic device performs a function according to an input by a user. The electronic device includes a market log acquisition unit that acquires a market log, the market log including contents of the input and an execution result of a process based on the function with respect to each execution unit of the process based on the function.

9 Claims, 24 Drawing Sheets

ELECTRONIC DEVICE, SERVICE EXECUTION SYSTEM, AND LOG ACQUISITION METHOD

INCORPORATION BY REFERENCE

This application is based upon, and claims the benefit of priority from, corresponding Japanese Patent Application Nos. 2017-166800 and 2017-182588, each filed in the Japan Patent Office on Aug. 31, 2017 and Sep. 22, 2017, the entire contents of which are incorporated herein by reference.

BACKGROUND

Unless otherwise indicated herein, the description in this section is not prior art to the claims in this application and is not admitted to be prior art by inclusion in this section.

There has been known a device as a typical electronic device to acquire logs that includes hardware including an operation unit and a control program that controls the hardware. This device acquires operation information to the operation unit, communication information between processes in the control program, a control command from the control program to the hardware, and state notification information from the hardware to the control program to which an occurrence time of each piece of information is added as logs.

Accordingly, when a defect occurs, this device can analyze the cause of the defect from the logs. Especially, since this device includes the operation information to the operation unit as the log, in addition to the communication information between the processes in the control program, the control command from the control program to the hardware, and the state notification information from the hardware to the control program, the device is configured to discriminate whether the cause of the defect is caused by an improper operation by a user or not.

SUMMARY

An electronic device according to one aspect of the disclosure performs a function according to an input by a user. The electronic device includes a market log acquisition unit that acquires a market log, the market log including contents of the input and an execution result of a process based on the function with respect to each execution unit of the process based on the function.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
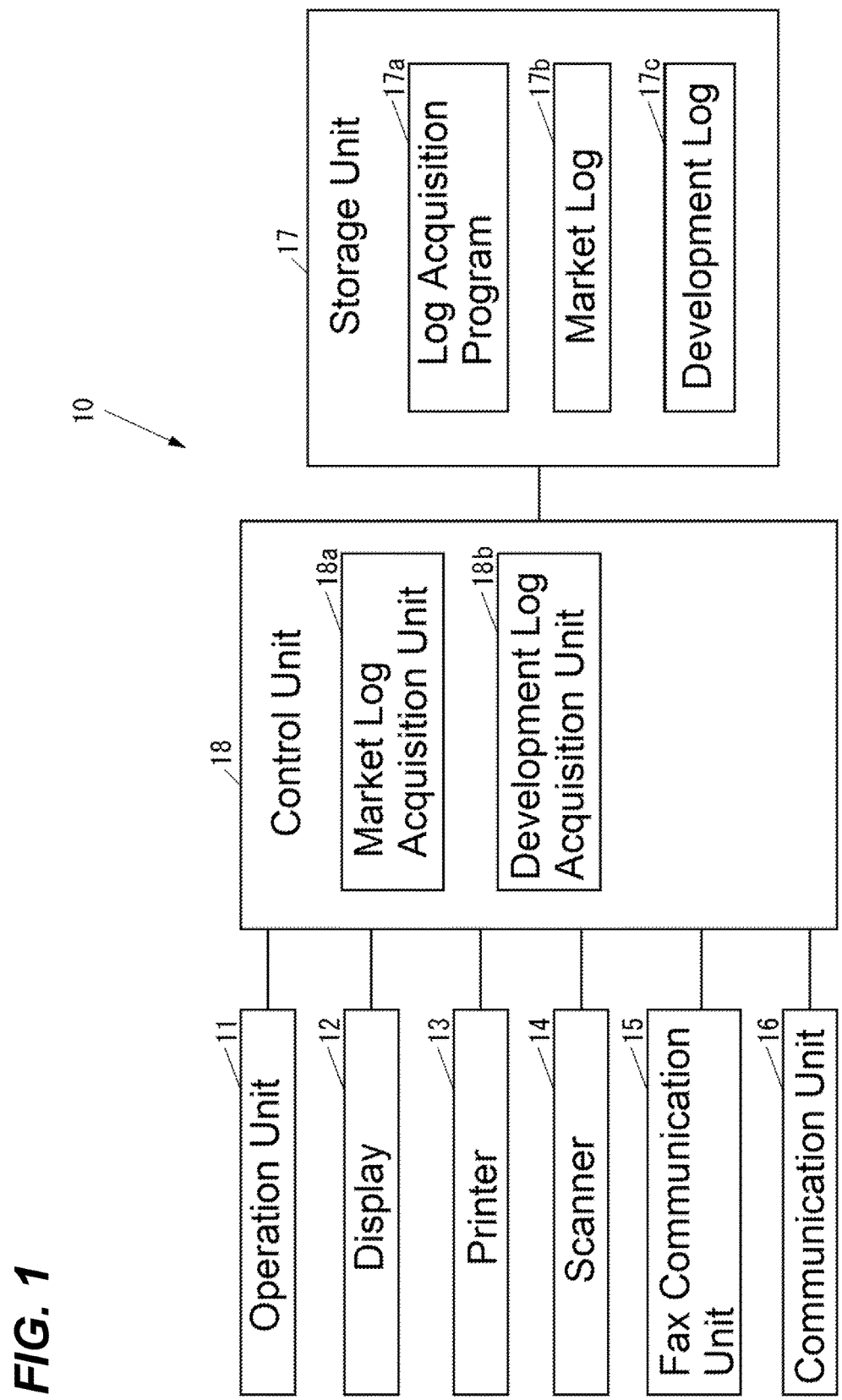
FIG. 1 illustrates a block diagram of an MFP according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

First Embodiment

The following describes a first embodiment of the disclosure with reference to the drawings.

First, the following describes a configuration of a multifunction peripheral (MFP) as an electronic device according to the first embodiment of the disclosure.

FIG. 1 illustrates a block diagram of an MFP 10 according to the first embodiment.

The MFP 10 illustrated in FIG. 1 includes an operation unit 11, a display 12, a printer 13, a scanner 14, a fax communication unit 15, a communication unit 16, a storage unit 17, and a control unit 18. The operation unit 11 is an input device such as buttons for inputting various kinds of operations. The display 12 is a display device such as a liquid crystal display (LCD) for displaying various kinds of information. The printer 13 is a print device for printing an image on a recording medium such as a paper sheet. The scanner 14 is a reading device for reading an image from a document. The fax communication unit 15 is a fax device for carrying out fax communications with an external facsimile device (not illustrated) via a communication line such as a dial-up line. The communication unit 16 is a communication device for communicating with external devices via a network such as a local area network (LAN) and the Internet or communicating directly by wired communications or wireless communications without via the network. The storage unit 17 is a non-volatile storage device such as a semiconductor memory and a hard disk drive (HDD) for storing various kinds of information. The control unit 18 controls the entire MFP 10.

The MFP 10 is an electronic device that performs a function according to an input by a user. The functions performed by the MFP 10 includes, for example, a print function, a copy function, a transmitting function, a FAX function, a BOX function, a report function, and a Web information reference/setting function. The print function prints an image based on print data input via the communication unit 16 on a recording medium by the printer 13. The copy function prints an image read from a document by the scanner 14 on the recording medium by the printer 13. The transmitting function transmits the image read from the document by the scanner 14 via the communication unit 16. The FAX function performs a fax transmission on the image read from the document by the scanner 14 via the fax communication unit 15. The BOX function stores the image read from the document by the scanner 14 or the image based on the print data input via the communication unit 16 in the storage unit 17. The report function prints various kinds of information such as logs of the MFP 10 on the recording medium by the printer 13. The Web information reference/setting function refers to the information of the MFP 10 and configures a setting on the MFP 10 from an external computer. The MFP 10 performs the print function, the copy function, the transmitting function, the FAX function, the BOX function, and the report function by a unit referred to as a job. However, the MFP 10 does not perform the Web information reference/setting function in units of jobs.

The storage unit 17 stores a log acquisition program 17a as an application program to acquire the log. The log acquisition program 17a may be installed on the MFP 10 at a production stage of the MFP 10, may be additionally installed from an external storage medium such as a universal serial bus (USB) memory on the MFP 10, or may be additionally installed from a network on the MFP 10.

The storage unit 17 can store a market log 17b as a function log that includes contents of an input (hereinafter referred to as "user input contents") to the MFP 10 by the user and the execution result of the function (hereinafter referred to as a "function execution result") by the MFP 10 according to the input to the MFP 10 by the user with respect to each execution unit of the function. A service person for MFP, a person of a vendor side of the MFP, services a customer, namely, the user of the MFP on the market. When the customer inputs an instruction to cause the MFP to perform the function to the MFP via the operation unit or the communication unit of the MFP and the execution result of the function by the MFP does not produce a result desired by the customer himself/herself, there may be a case where the customer requests the service person to explain about such operation by the MFP undesired by the customer himself/herself, namely, a problem and an event. The market log 17b is a log acquired as information with which the service person can adequately explain the problem and the event occurred in the MFP 10 on the request from the customer.

Figure 2:
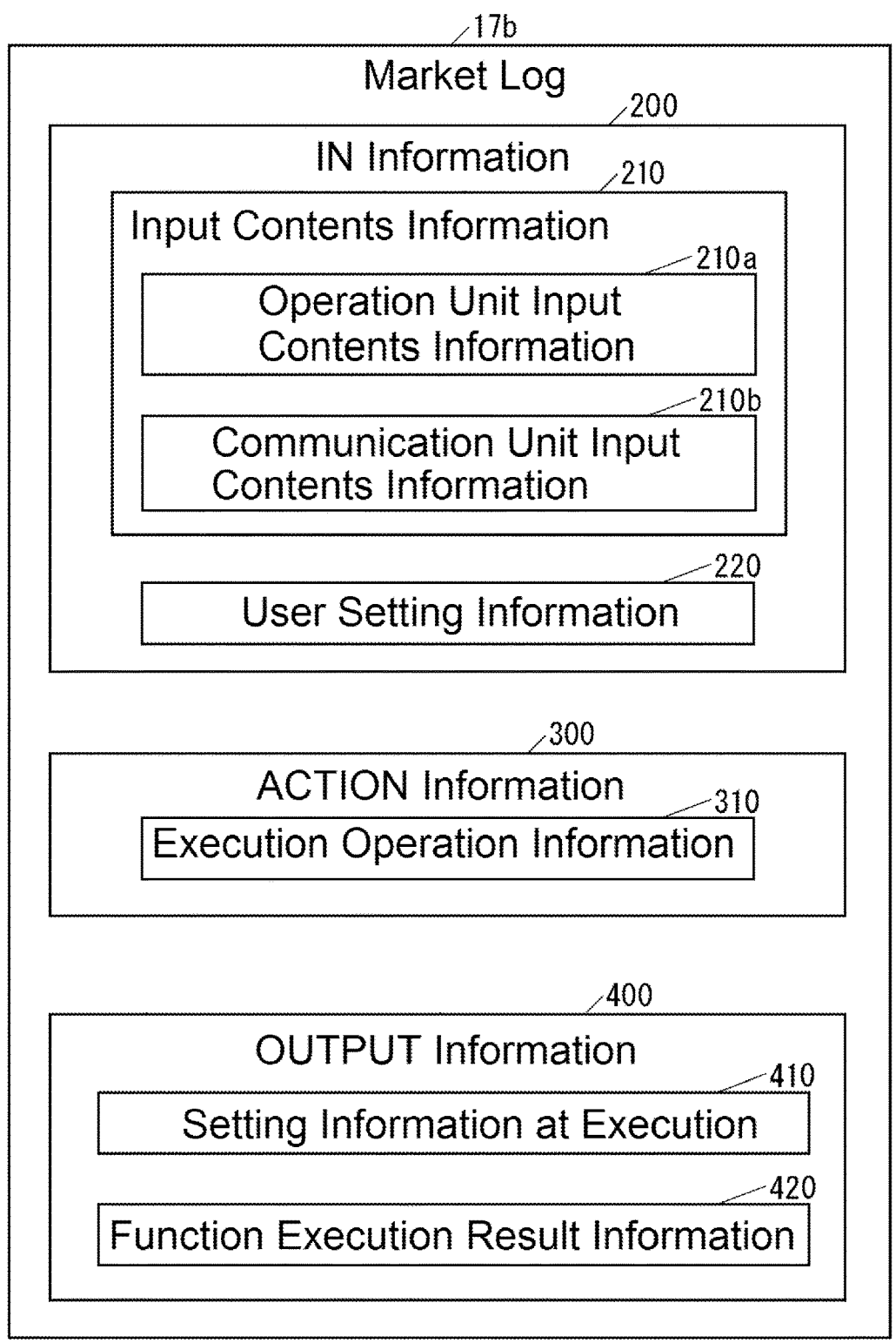
FIG. 2 illustrates an example of a market log according to the first embodiment.

FIG. 2 illustrates an example of the market log 17b.

The market log 17b illustrated in FIG. 2 includes information on each of "IN," "ACTION," and "OUTPUT" with respect to each execution unit of the function.

Information on "IN" (hereinafter referred to as "IN information") 200 is information indicative of user input contents. The IN information 200 includes input contents information 210, which includes operation unit input contents information 210a indicative of the user input contents to the operation unit 11 and communication unit input contents information 210b indicative of the user input contents via the communication unit 16, and user setting information 220 indicative of a setting of a job (hereinafter referred to as a "job setting"). As described above, since the Web information reference/setting function is not performed in units of jobs, the IN information 200 does not include the user setting information 220 regarding the Web information reference/setting function.

The operation unit input contents information 210a is information indicative of specific user input contents to the operation unit 11 such as which button on the operation unit 11 is pressed. The operation unit input contents information 210a includes all specific user input contents to the operation unit 11. Accordingly, there may be a case where the operation unit input contents information 210a includes the user input contents not directly related to the user setting information 220. Although not illustrated, the IN information 200 includes the times and the identification information of the users (hereinafter referred to as "user IDs") associated with the respective user input contents in the operation unit input contents information 210a. The time associated with each of the user input contents in the operation unit input contents information 210a indicates the time at which the input to the operation unit 11 has been performed. The user ID associated with each of the user input contents in the operation unit input contents information 210a indicates the user ID of the user who has performed the input to the operation unit 11.

The communication unit input contents information 210b is information indicative of specific user input contents obtained based on packets received via the communication unit 16, such as what sort of protocol being used and from where an access is made. Although not illustrated, the IN information 200 includes the times and the user IDs associated with the respective user input contents in the communication unit input contents information 210b. The time associated with each of the user input contents in the communication unit input contents information 210b indicates the time at which the input via the communication unit 16 has been performed. The user ID associated with each of the user input contents in the communication unit input contents information 210b indicates the user ID of the user who has performed the input via the communication unit 16.

The user setting information 220 is information indicative of setting contents to the function by the user. When the function is performed in units of jobs, the user setting information 220 indicates the job setting created by the control unit 18 based on the user input contents indicated by the input contents information 210. For example, with the case of the job of the print function (hereinafter referred to as a "print job"), the job setting is the print setting, and with the case of the job of the copy function (hereinafter referred to as a "copy job"), the job setting is the setting of copy. There is a possibility of causing a defect in a process that the control unit 18 creates the user setting information 220 based on the user input contents indicated in the input contents information 210. Accordingly, the user setting information 220 needs to be acquired separately from the input contents information 210. Although not illustrated, the IN information 200 includes the times and the user IDs associated with the user setting information 220. The time associated with the user setting information 220 indicates the time at which the execution of the function has been started. The user ID associated with the user setting information 220 indicates the user ID of the user who has instructed the execution of the function.

Information on "ACTION" (hereinafter referred to as "ACTION information") 300 includes execution operation information 310 that specifically indicates the operation performed by the MFP 10 according to the input by the user corresponding to the IN information 200. The execution operation information 310 does not include the execution result of the function. The ACTION information 300 is not essential information to grasp the problem and the event occurred in the MFP 10 and therefore the market log 17*b* needs not to include the ACTION information 300.

Information on "OUTPUT" (hereinafter referred to as "OUTPUT information") 400 includes execution-setting information 410, which indicates the job setting when the MFP 10 actually performs the job based on the job setting by the user corresponding to the IN information 200, and function execution result information 420, which indicates the execution result of the function by the operation performed by the MFP 10 according to the input by the user corresponding to the IN information 200. As described above, since the Web information reference/setting function is not performed in units of jobs, the OUTPUT information 400 does not include the execution-setting information 410 regarding the Web information reference/setting function. When the OUTPUT information 400 includes the execution-setting information 410, the execution-setting information 410 is included associated with the function execution result information 420.

Although not illustrated, the OUTPUT information 400 includes the times and the user IDs associated with the function execution result information 420. The time associated with the function execution result information 420 indicates the time at which the function has been terminated. The user ID associated with the function execution result information 420 indicates the user ID of the user who has instructed the execution of the function.

The execution-setting information 410 is information indicative of the setting contents to the function when the function is performed. When a plurality of settings input by the user are not actually applicable simultaneously at the execution of the job and the setting input by the user is not applicable at the execution of the job depending on the state of the MFP 10, the control unit 18 in the MFP 10 automatically changes these settings at the execution of the job. That is, the job setting indicated in the user setting information 220 is not always applied to the job as it is at the execution of the job. Accordingly, the execution-setting information 410 needs to be acquired separately from the user setting information 220.

As illustrated in FIG. 1, the storage unit 17 can store a development log 17*c* as a signal log including a signal transmitted from software to hardware in the MFP 10, a signal transmitted/received between the plurality of pieces of software in the MFP 10, and a signal received by the software from the hardware in the MFP 10. When the vendor of the MFP receives a complaint from the customer, namely, the user of the MFP regarding the problem and the event occurred in the MFP, the vendor reports the complaint received from the customer to a developer of the MFP. When accepting the complaint from the customer from the vendor, the developer needs to grasp the behavior and the state inside the MFP when the problem and the event have occurred to solve the problem and the event pointed out by the customer. The development log 17*c* is a log acquired as information with which the developer can adequately grasp the behavior and the state inside the MFP when the problem and the event have occurred to solve the problem and the event occurred in the MFP 10. It is difficult for the service person of the MFP 10 to interpret the development log 17*c*.

The control unit 18 includes, for example, a central processing unit (CPU), a read-only memory (ROM) that stores a program and various data, and a random-access memory (RAM) used as a work area of the CPU. The CPU executes the program stored in the ROM or the storage unit 17. Accordingly, the MFP 10 is a computer.

The control unit 18 performs the log acquisition program 17*a* to achieve a market log acquisition unit 18*a* as a function log acquisition unit that acquires the market log as the function log and a development log acquisition unit 18*b* as a signal log acquisition unit that acquires the development log as the signal log.

Next, the following describes the operations of the MFP 10.

While the MFP 10 is activated, the market log acquisition unit 18*a* continues to acquire the market logs 17*b*. Similarly, while the MFP 10 is activated, the development log acquisition unit 18*b* continues to acquire the development logs 17*c*.

The following describes the operations of the MFP 10 to acquire the market log 17*b*.

Figure 3:
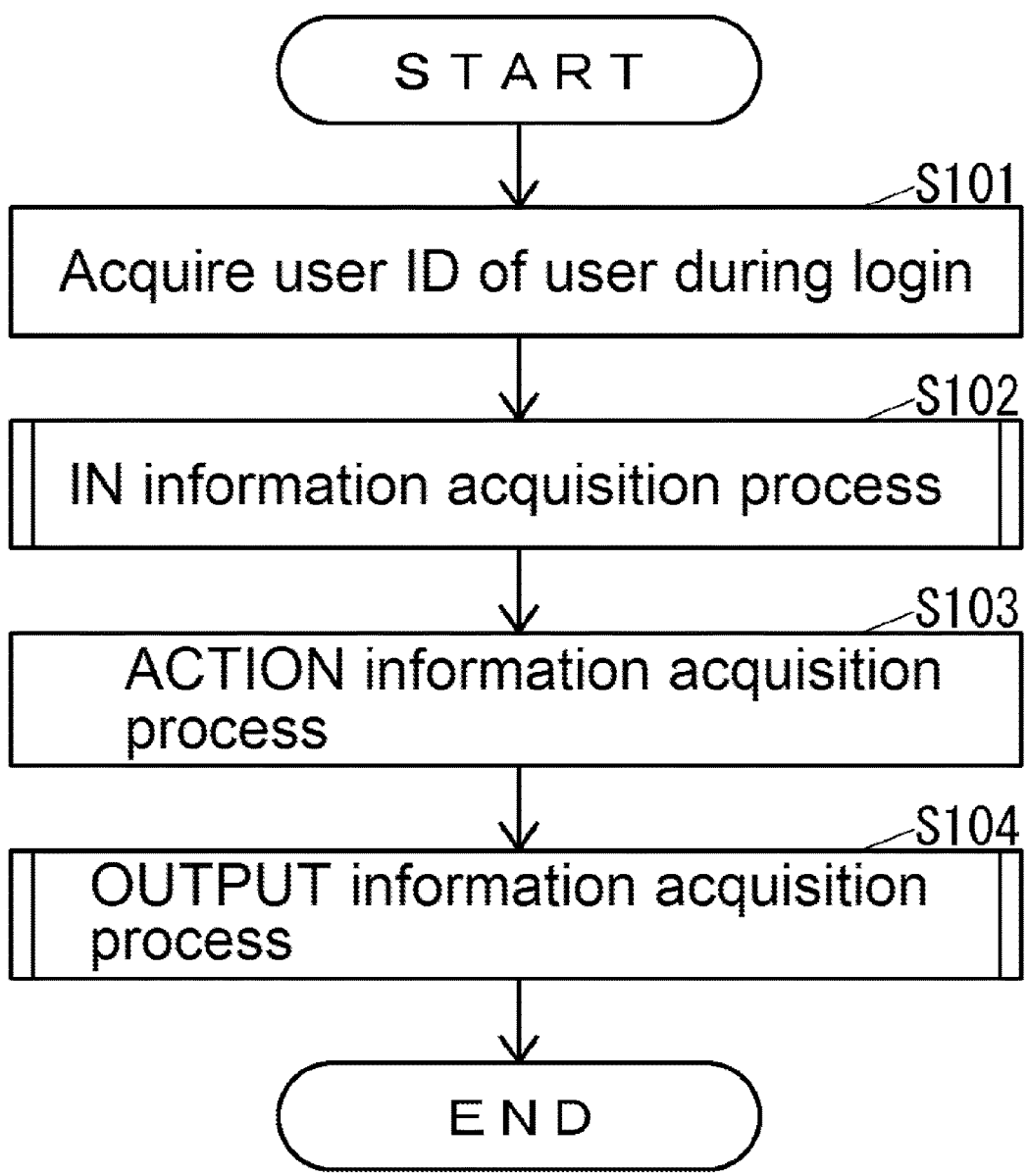
FIG. 3 illustrates operations of the MFP according to the first embodiment to acquire the market log.

FIG. 3 illustrates the operations of the MFP 10 to acquire the market log 17*b*.

As illustrated in FIG. 3, the market log acquisition unit 18*a* acquires the user ID of the user during login to the MFP 10 (Step S101).

Next, the market log acquisition unit 18*a* performs an IN information acquisition process to acquire the IN information 200 (Step S102).

Figure 4:
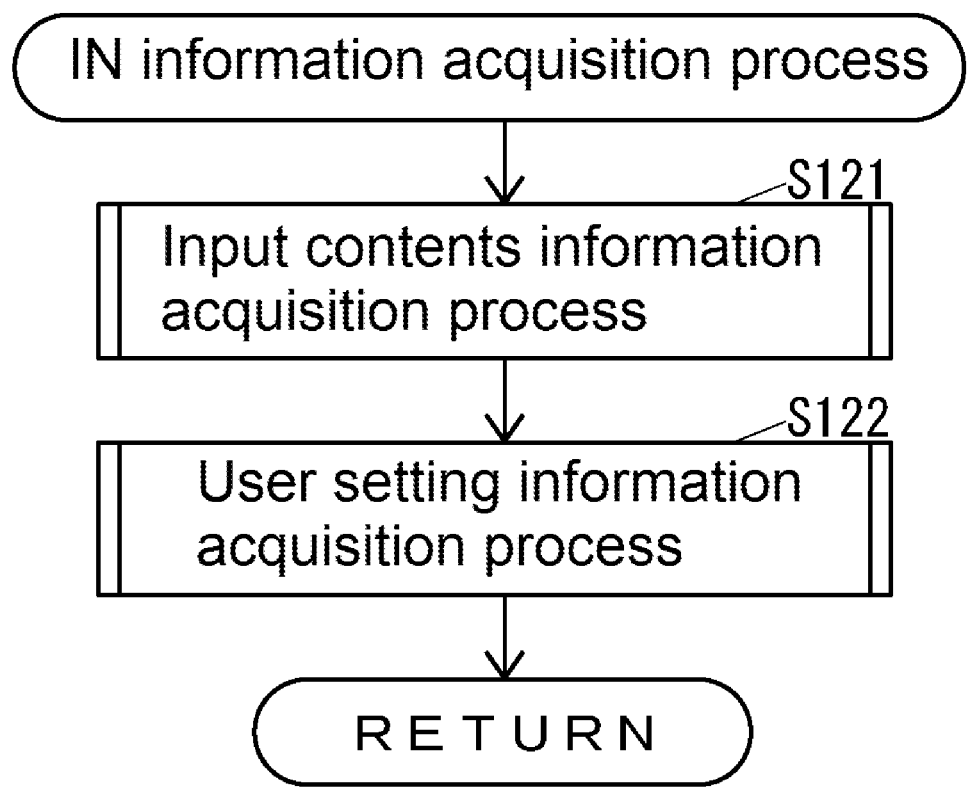
FIG. 4 illustrates an IN information acquisition process according to the first embodiment.

FIG. 4 illustrates the IN information acquisition process illustrated in FIG. 3.

As illustrated in FIG. 4, the market log acquisition unit 18*a* performs an input contents information acquisition process to acquire the input contents information 210 (Step S121). Whenever the input is performed to the operation unit 11 or the input via the communication unit 16 is performed, the market log acquisition unit 18*a* performs the input contents information acquisition process.

Figure 5:
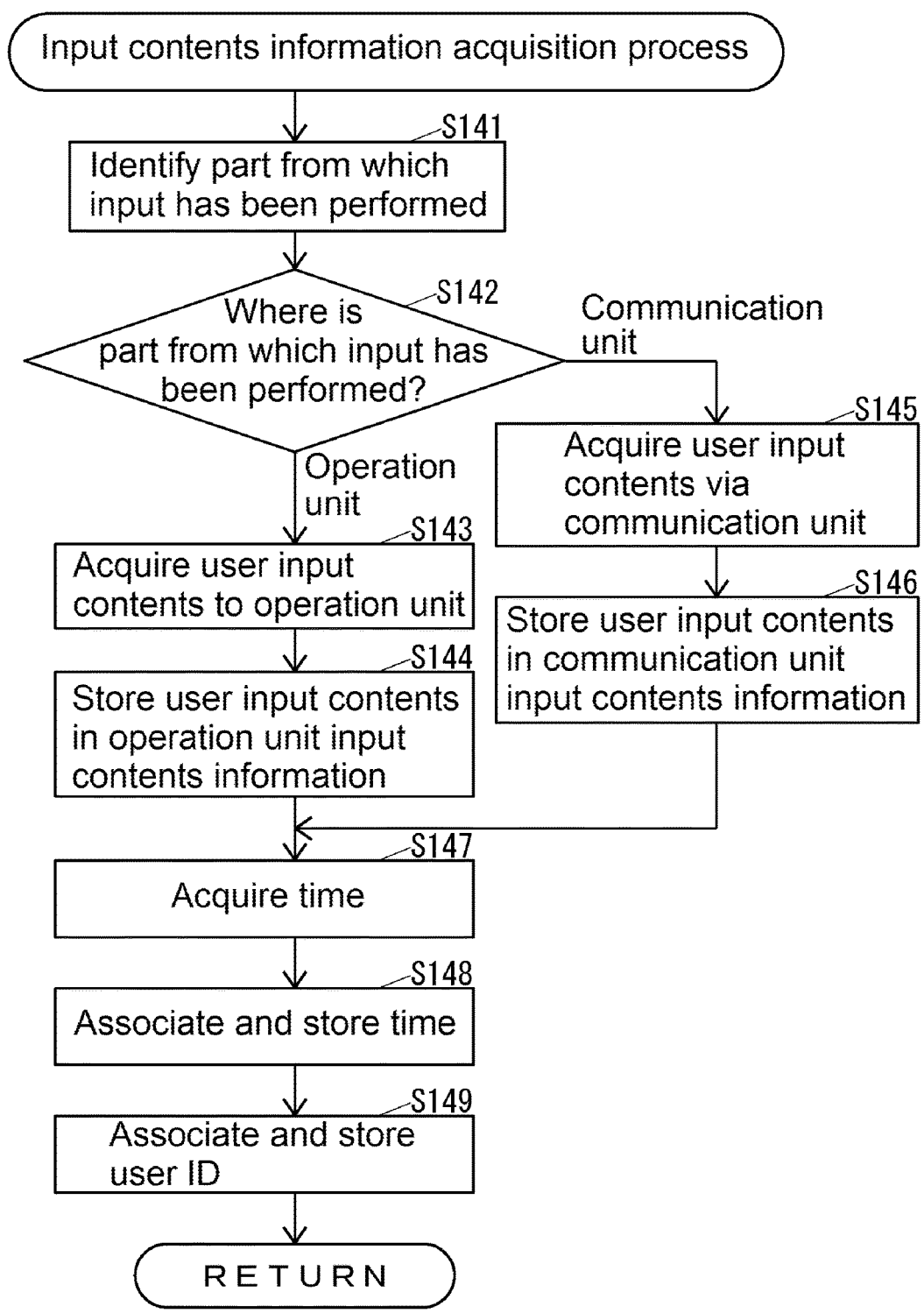
FIG. 5 illustrates an input contents information acquisition process according to the first embodiment.

FIG. 5 illustrates the input contents information acquisition process illustrated in FIG. 4.

As illustrated in FIG. 5, the market log acquisition unit 18*a* identifies a part from which the input has been performed (Step S141) to determine the part identified at Step S141 is any of the operation unit 11 and the communication unit 16 (Step S142).

When the market log acquisition unit 18a determines the part as the operation unit 11 at Step S142, the market log acquisition unit 18a acquires the user input contents to the operation unit 11 (Step S143) and stores the user input contents acquired at Step S143 in the operation unit input contents information 210a (Step S144).

When the market log acquisition unit 18a determines the part as the communication unit 16 at Step S142, the market log acquisition unit 18a acquires the user input contents via the communication unit 16 (Step S145) and stores the user input contents acquired at Step S145 in the communication unit input contents information 210b (Step S146).

After the process of Step S144 or S146, the market log acquisition unit 18a acquires the time at which the input has been performed (Step S147), associates the time acquired at Step S147 with the user input contents stored at Step S144 or S146, and stores the data (Step S148).

Next, the market log acquisition unit 18a associates the user ID of the user acquired at Step S101 with the user input contents stored at Step S144 or S146, stores the data (Step S149), and terminates the input contents information acquisition process illustrated in FIG. 5.

As illustrated in FIG. 4, when the function execution is started after the process of Step S121, the market log acquisition unit 18a performs a user setting information acquisition process to acquire the user setting information 220 (Step S122) and terminates the IN information acquisition process illustrated in FIG. 4.

Figure 6:
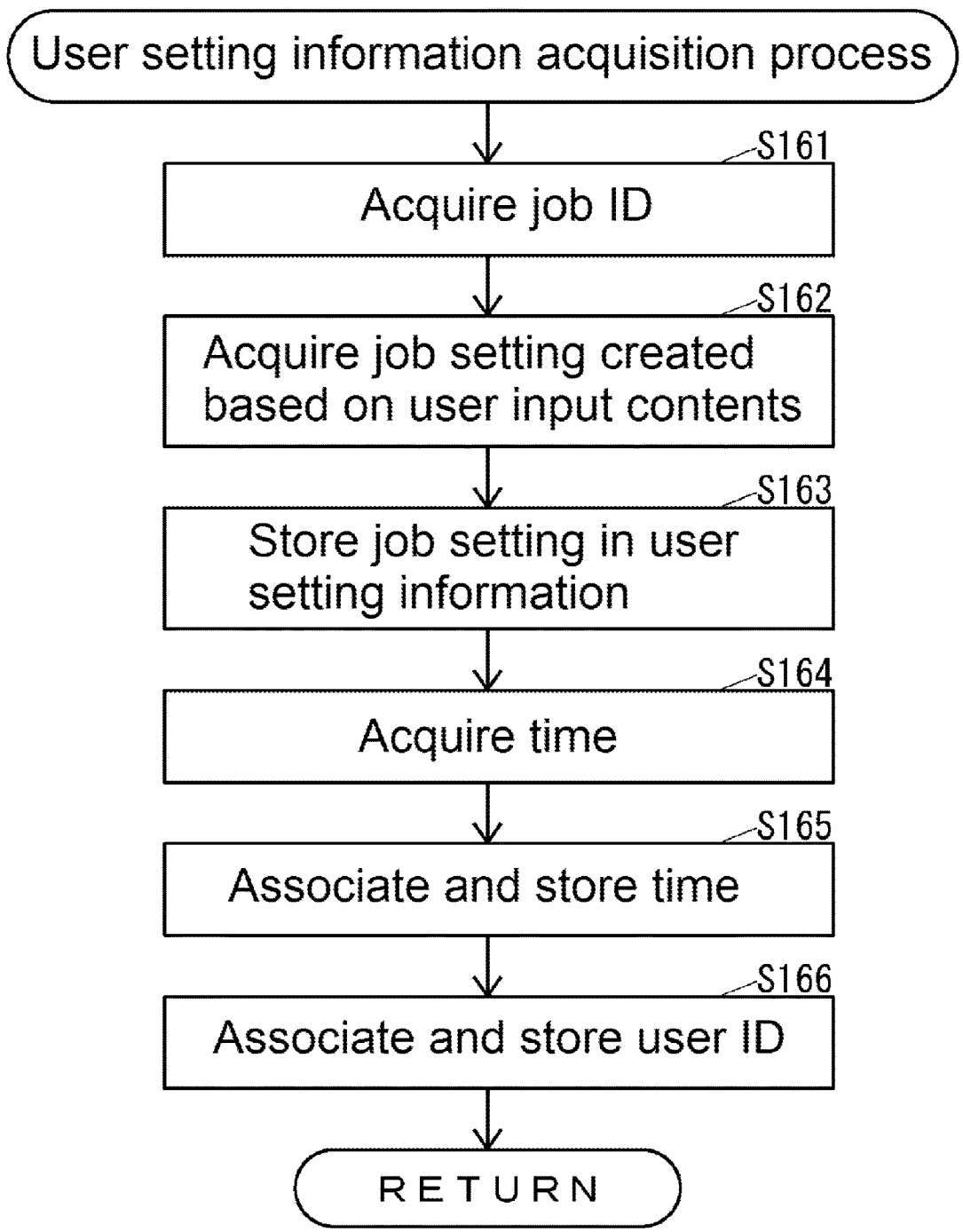
FIG. 6 illustrates a user setting information acquisition process according to the first embodiment.

FIG. 6 illustrates the user setting information acquisition process illustrated in FIG. 4.

As illustrated in FIG. 6, the market log acquisition unit 18a acquires a job ID as identification information of a target job (Step S161). Here, the control unit 18 assigns the job IDs mutually different depending on the target jobs at the execution of the jobs to manage the jobs. Accordingly, the market log acquisition unit 18a can use the job IDs assigned for the jobs to acquire the market logs 17b.

The market log acquisition unit 18a acquires the job setting, which is created by the control unit 18 based on the user input contents, as the job setting of the job identified by the job ID acquired at Step S161 (Step S162) and stores the job setting acquired at Step S162 in the user setting information 220 (Step S163).

Next, the market log acquisition unit 18a acquires the time at which the target job has been started (Step S164), associates the time acquired at Step S164 with the user setting information 220 stored at Step S163 and stores the data (Step S165).

Next, the market log acquisition unit 18a associates the user ID of the user acquired at Step S101 with the user setting information 220 stored at Step S163, stores the data (Step S166), and terminates the user setting information acquisition process illustrated in FIG. 6.

Based on a combination of the time stored at Step S148 and the user ID stored at Step S149 and a combination of the time stored at Step S165 and the user ID stored at Step S166, the market log acquisition unit 18a associates the operation unit input contents information 210a stored at Step S144 or the communication unit input contents information 210b stored at Step S146 and the user setting information 220 stored at Step S163 in the market log 17b.

As illustrated in FIG. 3, after the process of Step S102, the market log acquisition unit 18a performs an ACTION information acquisition process to acquire the ACTION information 300 (Step S103). In the ACTION information acquisition process, the market log acquisition unit 18a acquires the contents of the operation of the MFP 10 corresponding to the IN information 200 acquired at Step S102 to store the contents in the execution operation information 310. Next, the market log acquisition unit 18a associates the user ID of the user acquired at Step S101 with the stored execution operation information 310, stores the data, and terminates the ACTION information acquisition process.

The market log acquisition unit 18a may acquire the job ID as the identification information of the target job and may acquire the contents of the operation of the MFP 10 when the job identified by the acquired job ID is performed as the contents of the operation of the MFP 10 corresponding to the IN information 200. At this time, the market log acquisition unit 18a associates the user setting information 220 stored at Step S163 with the execution operation information 310 stored at the ACTION information acquisition process in the market log 17b based on the job ID acquired at Step S161 and the job ID acquired at the ACTION information acquisition process.

Next, when the execution of the function is terminated, the market log acquisition unit 18a performs an OUTPUT information acquisition process to acquire the OUTPUT information 400 (Step S104) and terminates the operation illustrated in FIG. 3.

Figure 7:
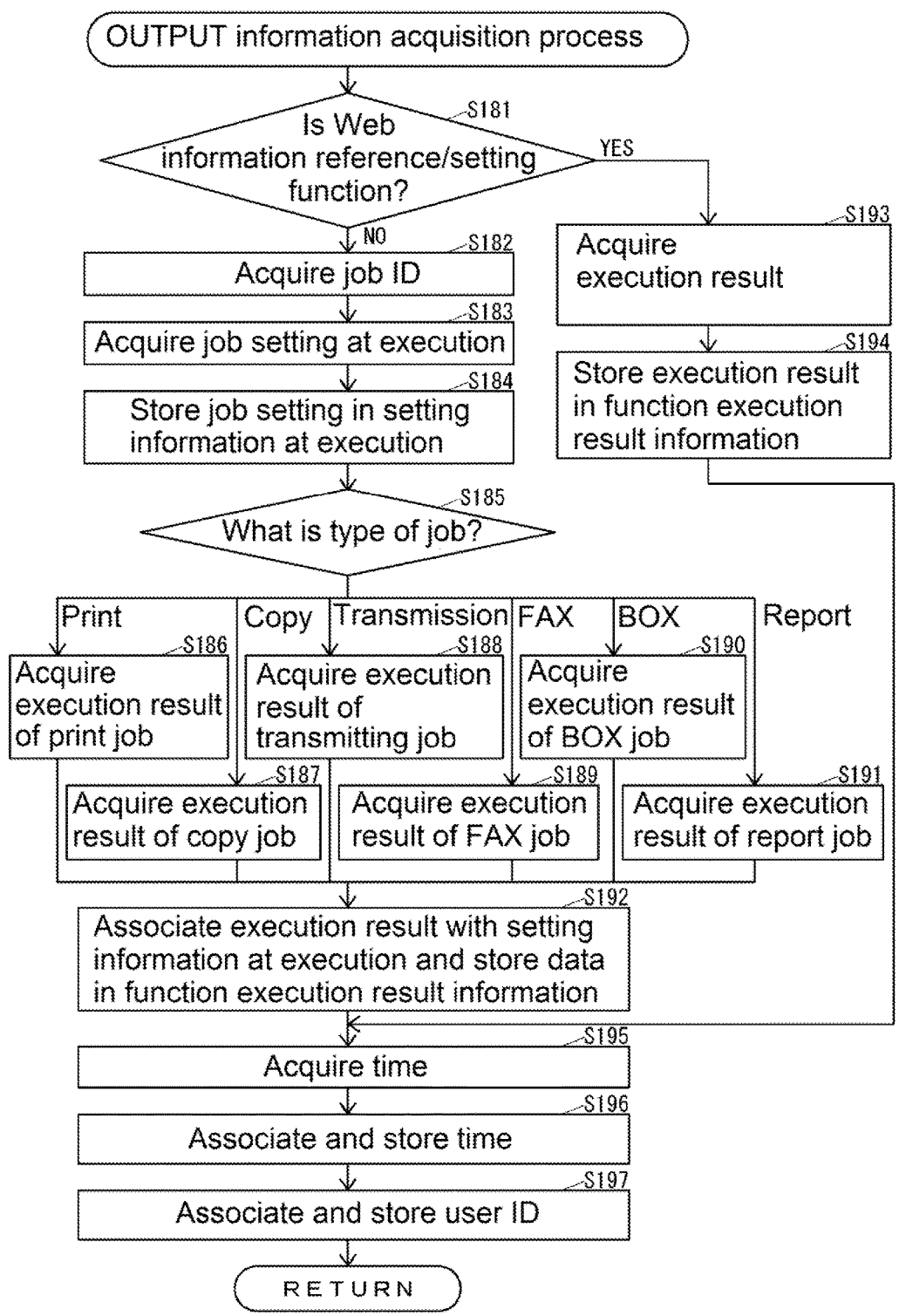
FIG. 7 illustrates an OUTPUT information acquisition process according to the first embodiment.

FIG. 7 illustrates the OUTPUT information acquisition process illustrated in FIG. 3.

As illustrated in FIG. 7, the market log acquisition unit 18a determines whether the function whose execution has been terminated is the Web information reference/setting function or not (Step S181).

When the market log acquisition unit 18a determines that the function whose execution has been terminated is not the Web information reference/setting function at Step S181, the market log acquisition unit 18a acquires the job ID as the identification information of the target job (Step S182).

The market log acquisition unit 18a acquires the job setting when the target job is performed as the job setting of the job identified by the job ID acquired at Step S182 (Step S183) and stores the job setting acquired at Step S183 in the execution-setting information 410 (Step S184).

Next, the market log acquisition unit 18a determines the type of the job included in the job setting acquired at Step S183 (Step S185).

When the market log acquisition unit 18a determines the type as the print job at Step S185, the market log acquisition unit 18a acquires the execution result of the target print job (Step S186). Here, the execution result acquired at Step S186 includes, for example, information on whether the target print job has been normally terminated or not, information on the number of sheets of the recording medium printed by the target print job, information on whether the printing by the target print job is any of a monochrome printing and a color printing, and information on whether the printing by the target print job is any of a single-side printing and a duplex printing.

When the market log acquisition unit 18a determines the type as the copy job at Step S185, the market log acquisition unit 18a acquires the execution result of the target copy job (Step S187). Here, the execution result acquired at Step S187 includes, for example, information on whether the target copy job has been normally terminated or not, information on the number of sheets of the recording medium printed by the target copy job, information on whether the printing by the target copy job is any of a monochrome printing and a color printing, and information on whether the printing by the target copy job is any of a single-side printing and a duplex printing.

When the market log acquisition unit 18a determines the type as the job of the transmitting function (hereinafter referred to as a "transmitting job") at Step S185, the market log acquisition unit 18a acquires the execution result of the target transmitting job (Step S188). Here, the execution result acquired at Step S188 includes, for example, information on whether the target transmitting job has been normally terminated or not, information on a size of data transmitted via the communication unit 16 by the target transmitting job, information on a destination to which the data has been transmitted via the communication unit 16 by the target transmitting job, and information on the transmitting method of the data by the target transmitting job, such as a transmission by e-mail, a transmission by Server Message Block (SMB), and a transmission by File Transfer Protocol (FTP).

When the market log acquisition unit 18a determines the type as the job of the FAX function (hereinafter referred to as a "FAX job") at Step S185, the market log acquisition unit 18a acquires the execution result of the target FAX job (Step S189). Here, the execution result acquired at Step S189 includes, for example, information on whether the target FAX job has been normally terminated or not, information on a size of data transmitted via the fax communication unit 15 by the target FAX job, and information on the destination to which the data has been transmitted via the fax communication unit 15 by the target FAX job.

When the market log acquisition unit 18a determines the type as the job of the BOX function (hereinafter referred to as a "BOX job") at Step S185, the market log acquisition unit 18a acquires the execution result of the target BOX job (Step S190). Here, the execution result acquired at Step S190 includes, for example, information on whether the target BOX job has been normally terminated or not and information on a size of data stored in the storage unit 17 by the target BOX job.

When the market log acquisition unit 18a determines the type as the job of the report function (hereinafter referred to as a "report job") at Step S185, the market log acquisition unit 18a acquires the execution result of the target report job (Step S191). Here, the execution result acquired at Step S191 includes, for example, information on whether the target report job has been normally terminated or not.

When the process of Step S186, S187, S188, S189, S190, or S191 is terminated, the market log acquisition unit 18a associates the execution result acquired at Step S186, S187, S188, S189, S190, or S191 with the execution-setting information 410 stored at Step S184 and stores the data in the function execution result information 420 (Step S192).

When the market log acquisition unit 18a determines that the function whose execution has been terminated is the Web information reference/setting function at Step S181, the market log acquisition unit 18a acquires the execution result of the target Web information reference/setting function (Step S193) and stores the execution result acquired at Step S193 in the function execution result information 420 (Step S194).

After the process of Step S192 or S194, the market log acquisition unit 18a acquires the time at which the target function has been terminated (Step S195), associates the time acquired at Step S195 with the function execution result information 420 stored at Step S192 or S194, and stores the data (Step S196).

Next, the market log acquisition unit 18a associates the user ID of the user acquired at Step S101 with the function execution result information 420 stored at Step S192 or S194, stores the data (Step S197), and terminates the OUTPUT information acquisition process illustrated in FIG. 7.

The market log acquisition unit 18a associates the user setting information 220 stored at Step S163 with the function execution result information 420 stored at Step S192 in the market log 17b based on the job ID acquired at Step S161 and the job ID acquired at Step S182.

As described above, the MFP 10 acquires the market log 17b, which includes the contents of the inputs by the user and the execution results of the functions according to the inputs by the user with respect to each execution unit of the function. This ensures facilitating understanding of how the function has been performed as the result of operation of what sort of input by the user with the market log 17b. Accordingly, the MFP 10 is configured to enhance assistance for the explanation to the user regarding a defect by a person who does not have a high technical level such as the service person.

By confirming the market logs 17b, the service person can promptly explain the situation to the customer, namely, the user of the MFP 10 regarding the problem and the event occurred in the MFP 10, thereby ensuring, for example, a suggestion of an alternate method to the customer. For example, the service person can determine whether the cause of the execution result of the function by the MFP failing to produce a result desired by the customer is an improper operation to the MFP by the customer or not based on the market log 17b.

When explaining the problem and the event occurred in the MFP 10 to the customer, the service person can accurately explain the problem and the event to the customer with the IN information 200 and the OUTPUT information 400 in the market log 17b. Especially, since the market log 17b includes the IN information 200 and the OUTPUT information 400 with respect to each execution unit of the function, the service person can grasp the problem and the event occurred in the MFP 10 regarding the respective functions of the print function, the copy function, the transmitting function, the FAX function, the BOX function, the report function, and the Web information reference/setting function in the MFP 10.

The MFP 10 includes the user setting information 220 and the execution-setting information 410 in the market log 17b. This ensures facilitating understanding of how the setting contents performed to the function by the user have been finally changed at the execution of the function with the market log 17b.

The MFP 10 acquires the development log 17c separately from the market log 17b. Accordingly, the MFP 10 is configured to appropriately assist the explanation to the user regarding a defect by the person who does not have the high technical level such as the service person with the market log 17b and configured to appropriately assist a detailed analysis of the cause of the defect by a person who has a high technical level such as the developer with the development log 17c.

Example of Implemented Aspect according to First Embodiment

An electronic device of the disclosure is an electronic device that performs a function according to an input by a user. The electronic device includes a function log acquisition unit that acquires a market log. The market log includes contents of the input and an execution result of the function with respect to each execution unit of the function.

With this configuration, the electronic device of the disclosure acquires the market log, which includes the contents of the inputs by the user and the execution results of the functions according to the inputs by the user with respect to each execution unit of the function. This ensures facilitating understanding of how the function has been performed as the result of operation of what sort of input by the user with the market log. Accordingly, the electronic device of the disclosure is configured to enhance assistance for the explanation to the user regarding a defect by a person who does not have a high technical level.

The electronic device of the disclosure may be configured as follows. The contents of the input include setting contents to the function by the user. The market log includes the setting contents to the function at an execution of the function.

With this configuration, the electronic device of the disclosure ensures facilitating understanding of how the setting contents performed to the function by the user have been finally changed at the execution of the function with the market log.

The electronic device of the disclosure includes a signal log acquisition unit that acquires a signal log. The signal log includes a signal transmitted from software to hardware in the electronic device, a signal transmitted/received between a plurality of pieces of the software, and a signal received by the software from the hardware.

With this configuration, the electronic device of the disclosure acquires the signal log separately from the market log. Accordingly, the electronic device is configured to appropriately assist the explanation to the user regarding a defect by the person who does not have the high technical level with the market log and configured to appropriately assist a detailed analysis of the cause of the defect by a person who has a high technical level with the signal log.

A log acquisition program of the disclosure causes a computer to achieve as a market log acquisition unit. The market log acquisition unit acquires a market log. The market log includes contents of an input to the computer by a user and an execution unit of a function by the computer according to the input with respect to each execution unit of the function.

With this configuration, the computer that performs the log acquisition program of the disclosure acquires the market log, which includes the contents of the inputs by the user and the execution results of the functions according to the inputs by the user with respect to each execution unit of the market. This ensures facilitating understanding of how the function has been performed as the result of operation of what sort of input by the user with the market log. Accordingly, the computer that performs the log acquisition program of the disclosure is configured to enhance assistance for the explanation to the user regarding a defect by a person who does not have a high technical level.

A log acquisition method of the disclosure includes a market log acquisition step that acquires a market log. The market log includes contents of an input to an electronic device by a user and an execution result of a function by the electronic device according to the input with respect to each execution unit of the function.

With this configuration, the log acquisition method of the disclosure acquires the market log, which includes the contents of the inputs to the electronic device by the user and the execution results of the functions by the electronic device according to the inputs to the electronic device by the user with respect to each execution unit of the function. This ensures facilitating understanding of how the function has been performed by the electronic device as the result of operation of what sort of input by the user to the electronic device with the market log. Accordingly, the log acquisition method of the disclosure is configured to enhance assistance for the explanation to the user regarding a defect in the electronic device by a person who does not have a high technical level.

While the electronic device of the disclosure is the MFP in the first embodiment, the electronic device may be an image forming apparatus other than the MFP such as a printer-only machine, a copy-only machine, a scanner-only machine, and a FAX-only machine or may be an electronic device other than the image forming apparatus such as a personal computer (PC).

Second Embodiment

The following describes a second embodiment of the disclosure with reference to the drawings.

First, the following describes a configuration of a service execution system according to the second embodiment of the disclosure.

Figure 8:
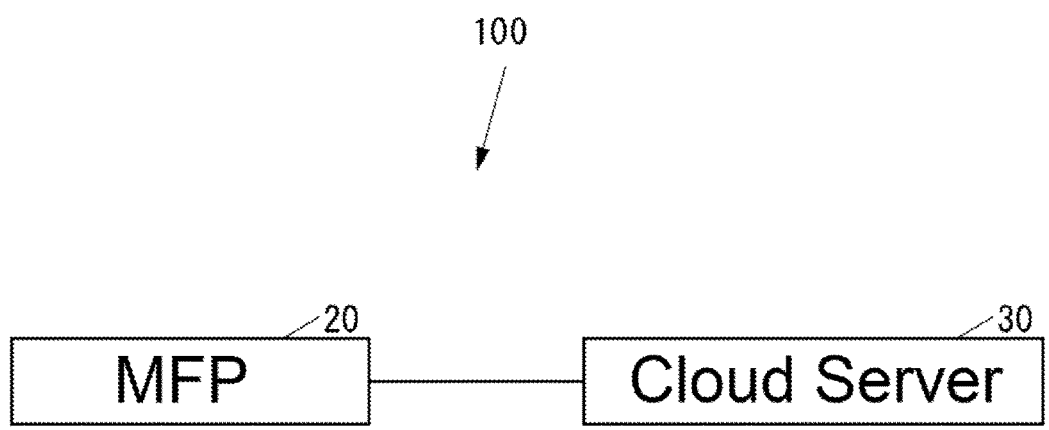
FIG. 8 illustrates a block diagram of a service execution system according to a second embodiment of the disclosure.

FIG. 8 is a block diagram of a service execution system 100 according to the second embodiment.

The service execution system 100 illustrated in FIG. 8 is a system in which a plurality of nodes cooperate with one another to perform a service according to an input by a user. The service execution system 100 includes each of a multifunction peripheral (MFP) 20 as an electronic device and a cloud server 30 that provides a cloud service as the nodes.

The cloud server 30 may be achieved by one computer or may be achieved by a plurality of computers.

When the cloud service provided by the cloud server 30 is a storage service, the service performed by the service execution system 100 includes, for example: a service that stores image data of an image read from a document by a scanner (described later) of the MFP 20 in the cloud server 30; a service that performs a printing by a printer (described later) of the MFP 20 based on the image data stored in the cloud server 30 according to an instruction to the cloud server 30 by the user via a graphical user interface (GUI) provided by the cloud server 30, and a service that performs a printing by the printer of the MFP 20 based on the image data stored in the cloud server 30 according to an instruction to the MFP 20 by the user via an operation unit (described later) of the MFP 20.

Figure 9:
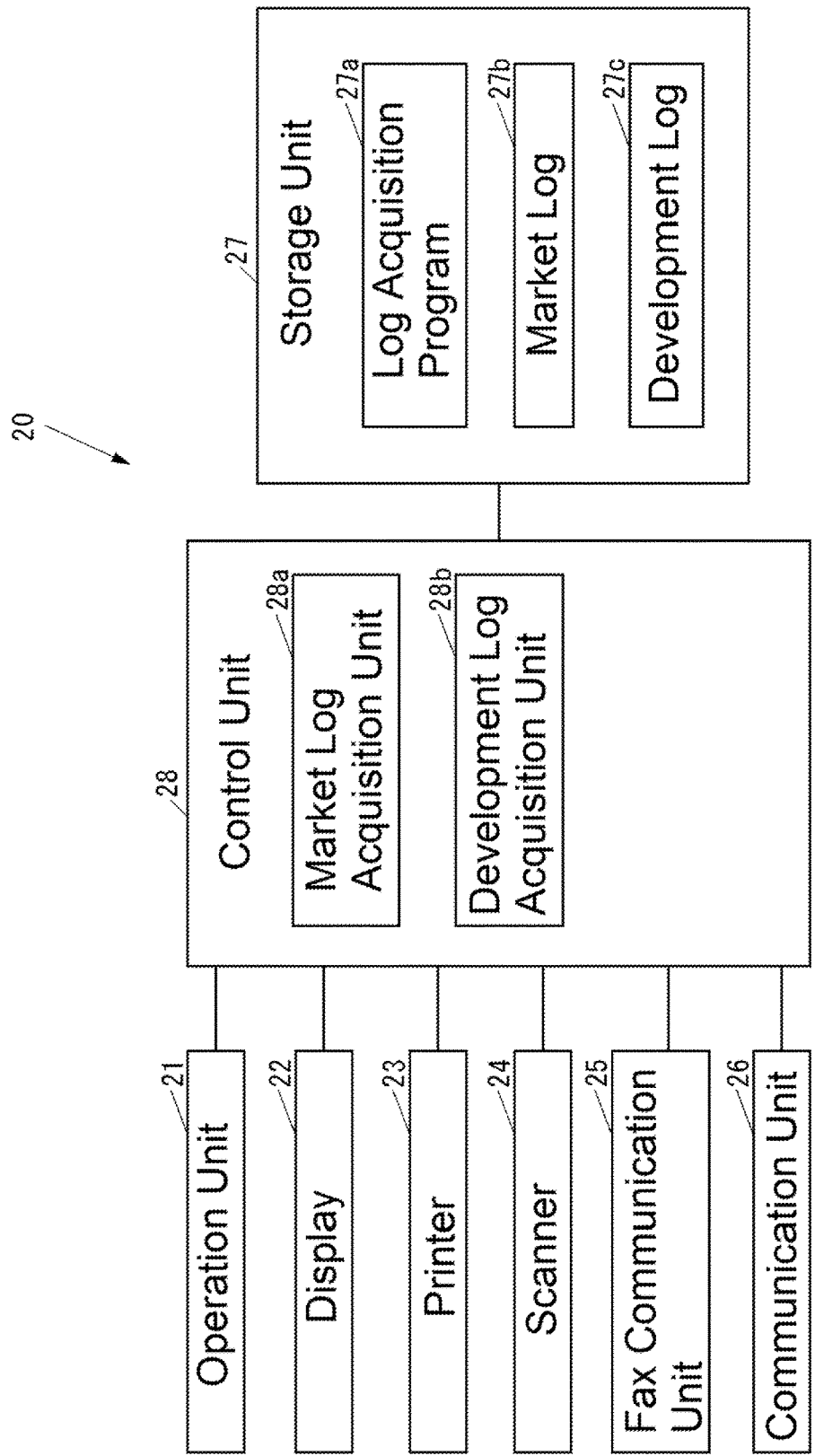
FIG. 9 illustrates a block diagram of an MFP according to the second embodiment.

FIG. 9 illustrates a block diagram of the MFP 20.

The MFP 20 illustrated in FIG. 9 includes an operation unit 21, a display 22, a printer 23, a scanner 24, a fax communication unit 25, a communication unit 26, a storage unit 27, and a control unit 28. The operation unit 21 is an input device such as buttons for inputting various kinds of operations. The display 22 is a display device such as a liquid crystal display (LCD) for displaying various kinds of information. The printer 23 is a print device for printing an image on a recording medium such as a paper sheet. The scanner 24 is a reading device for reading an image from a document. The fax communication unit 25 is a fax device for carrying out fax communications with an external facsimile device (not illustrated) via a communication line such as a dial-up line. The communication unit 26 is a communication device for communicating with external devices via a network such as a local area network (LAN) and the Internet or communicating directly by wired communications or wireless communications without via the network. The storage unit 27 is a non-volatile storage device such as a semiconductor memory and a hard disk drive (HDD) for storing various kinds of information. The control unit 28 controls the entire MFP 20.

The functions performed by the MFP 20 includes, for example, a print function, a copy function, a transmitting function, a FAX function, a BOX function, a report function, and a Web information reference/setting function. The print function prints an image based on print data input via the communication unit 26 on a recording medium by the printer 23. The copy function prints an image read from a document by the scanner 24 on the recording medium by the printer 23. The transmitting function transmits the image read from the document by the scanner 24 via the communication unit 26. The FAX function performs a fax transmission on the image read from the document by the scanner 24 via the fax communication unit 25. The BOX function stores the image read from the document by the scanner 24 or the image based on the print data input via the communication unit 26 in the storage unit 27. The report function prints various kinds of information such as logs of the MFP 20 on the recording medium by the printer 23. The Web information reference/setting function refers to the information of the MFP 20 and configures a setting on the MFP 20 from an external computer. The MFP 20 performs the print function, the copy function, the transmitting function, the FAX function, the BOX function, and the report function by a unit referred to as a job. However, the MFP 20 does not perform the Web information reference/setting function in units of jobs.

The storage unit 27 stores a log acquisition program 27*a* as an application program to acquire the log. The log acquisition program 27*a*, for example, may be installed on the MFP 20 at a production stage of the MFP 20, may be additionally installed from an external storage medium such as a universal serial bus (USB) memory on the MFP 20, or may be additionally installed from a network on the MFP 20.

The storage unit 27 can store a market log 27*b* as a service log that includes contents of an input (hereinafter referred to as "user input contents") to the service execution system 100 by the user and the execution result of the service (hereinafter referred to as a "service execution result") by the service execution system 100 according to the input to the service execution system 100 by the user with respect to each execution unit of the service. A service person for MFP, a person of a vendor side of the MFP, services a customer, namely, the user of the MFP on the market. When the execution result of the service by the service execution system does not produce a result desired by the customer himself/herself while the customer inputs an instruction to cause the service execution system to perform the service to the MFP via the operation unit or the communication unit of the MFP or inputs an instruction to cause the service execution system to perform the service from the GUI provided by the cloud server to the cloud server, there may be a case where the customer requests the service person to explain about such operation by the service execution system undesired by the customer himself/herself, namely, a problem and an event. The market log 27*b* is a log acquired as information with which the service person can adequately explain the problem and the event occurred in the service execution system 100 on the request from the customer.

The storage unit 27 can store a development log 27*c* as a signal log including a signal transmitted from software to hardware in the MFP 20, a signal transmitted/received between the plurality of pieces of software in the MFP 20, and a signal received by the software from the hardware in the MFP 20. When the vendor of the MFP receives a complaint from the customer, namely, the user of the MFP regarding the problem and the event occurred in the MFP, the vendor reports the complaint received from the customer to a developer of the MFP. When accepting the complaint from the customer from the vendor, the developer needs to grasp the behavior and the state inside the MFP when the problem and the event have occurred to solve the problem and the event pointed out by the customer. The development log 27*c* is a log acquired as information with which the developer can adequately grasp the behavior and the state inside the MFP when the problem and the event have occurred to solve the problem and the event occurred in the MFP 20. It is difficult for the service person of the MFP 20 to interpret the development log 27*c*.

The control unit 28 includes, for example, a central processing unit (CPU), a read-only memory (ROM) that stores a program and various data, and a random-access memory (RAM) used as a work area of the CPU. The CPU executes the program stored in the ROM or the storage unit 27.

The control unit 28 performs the log acquisition program 27*a* to achieve a market log acquisition unit 28*a* as a service log acquisition unit that acquires the market log as the service log and a development log acquisition unit 28*b* as a signal log acquisition unit that acquires the development log as the signal log.

Figure 10:
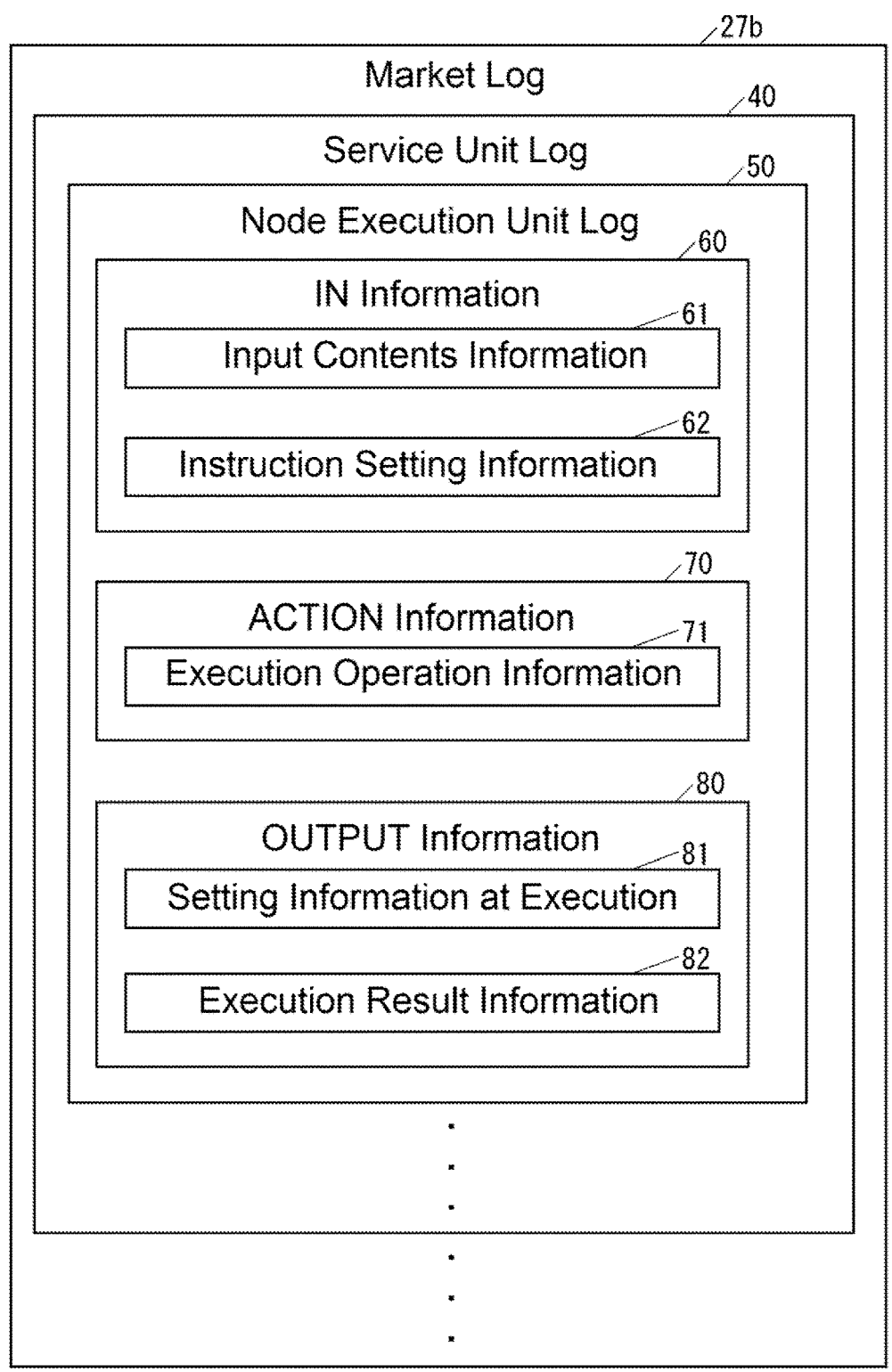
FIG. 10 illustrates an example of a market log according to the second embodiment.

FIG. 10 illustrates an example of the market log 27*b*.

The market log 27*b* illustrated in FIG. 10 includes a log (hereinafter referred to as a "service unit log") with respect to each execution unit of the service. All service unit logs included in the market log 27*b* each has the configuration similar to one another. The following describes a service unit log 40 representing all service unit logs included in the market log 27*b*.

The service unit log 40 includes a log (hereinafter referred to as a "node execution unit log") with respect to each execution unit at each node in the service execution system 100. The node execution unit may be an execution unit of the function by each node. All node execution unit logs included in the service unit log 40 each has the configuration similar to one another. The following describes a node execution unit log 50 representing all node execution unit logs included in the service unit log 40.

The node execution unit log 50 includes information on "IN" (hereinafter referred to as "IN information") 60, information on "ACTION" (hereinafter referred to as "ACTION information") 70, and information on "OUTPUT" (hereinafter referred to as "OUTPUT information") 80.

The IN information 60 includes input contents information 61 indicative of contents of a specific input (hereinafter referred to as "user input contents" to the service execution system 100 by the user and instruction setting information 62 indicative of a setting instructed from the outside of the nodes.

When the node execution unit log 50 is a log regarding the MFP 20, the input contents information 61 is any of operation unit input contents information indicative of input contents to the operation unit 21 and communication unit input contents information indicative of input contents by the user via the communication unit 26. When the node execution unit log 50 is a log regarding the cloud server 30, the input contents information 61 is GUI input contents information indicative of input contents via the GUI provided by the cloud server 30.

When the node execution unit log 50 is a log of an operation according to an instruction from another node among the nodes in the service execution system 100, since input contents are absent, the IN information 60 does not include the input contents information 61.

The IN information 60 including the input contents information 61 is information indicative of the user input contents. Meanwhile, the IN information 60 not including the input contents information 61 is not information indicative of the user input contents.

When the node execution unit log 50 is a log regarding the MFP 20, the instruction setting information 62 indicates a setting of a job (hereinafter referred to as a "job setting"). Here, as described above, since the Web information reference/setting function is not performed in units of jobs, the IN information 60 does not include the instruction setting information 62 regarding the Web information reference/setting function.

The operation unit input contents information is information indicative of specific input contents to the operation unit 21 such as which button on the operation unit 21 is pressed. The operation unit input contents information includes all specific user input contents to the operation unit 21. Accordingly, there may be a case where the operation unit input contents information includes the input contents not directly related to the instruction setting information 62. Although not illustrated, the IN information 60 includes the times and the identification information of the users (hereinafter referred to as "user IDs") associated with the respective input contents in the operation unit input contents information. The time associated with each of the input contents in the operation unit input contents information indicates the time at which the input to the operation unit 21 has been performed. The user ID associated with each of the input contents in the operation unit input contents information indicates the user ID of the user who has performed the input to the operation unit 21.

The communication unit input contents information is information indicative of specific input contents obtained based on packets received via the communication unit 26, such as what sort of protocol being used and from where an access is made. Although not illustrated, the IN information 60 includes the times and the user IDs associated with the respective input contents in the communication unit input contents information. The time associated with each of the input contents in the communication unit input contents information indicates the time at which the input via the communication unit 26 has been performed. The user ID associated with each of the input contents in the communication unit input contents information indicates the user ID of the user who has performed the input via the communication unit 26.

The GUI input contents information is information indicative of specific input contents to the GUI such as which operation regions of the GUI being operated. The GUI input contents information includes all specific input contents to the GUI. Accordingly, there may be a case where the GUI input contents information includes the input contents not directly related to the instruction setting information 62. Although not illustrated, the IN information 60 includes the times and the user IDs associated with the respective input contents in the GUI input contents information. The time associated with each of the input contents in the GUI input contents information indicates the time at which the input to the GUI has been performed. The user ID associated with each of the input contents in the GUI input contents information indicates the user ID of the user who has performed the input to the GUI.

When the IN information 60 includes the input contents information 61, the instruction setting information 62 is information indicative of setting contents to the service by the user. For example, when the node execution unit log 50 is a log regarding the MFP 20, the instruction setting information 62 indicates the job setting created by the control unit 28 based on the input contents indicated by the input contents information 61 when the function is performed in units of jobs. For example, with the case of the job of the print function (hereinafter referred to as a "print job"), the job setting is the print setting, and with the case of the job of the copy function (hereinafter referred to as a "copy job"), the job setting is the setting of copy. There is a possibility of causing a defect in a process that the node creates the instruction setting information 62 based on the input contents indicated in the input contents information 61. Accordingly, the instruction setting information 62 needs to be acquired separately from the input contents information 61. Although not illustrated, the IN information 60 includes the times and the user IDs associated with the instruction setting information 62. The time associated with the instruction setting information 62 indicates the time at which the execution of the function provided by the MFP 20 starts in the case of the MFP 20 and indicates the time at which the execution of the cloud service provided by the cloud server 30 starts in the case of the cloud server 30. The user ID associated with the instruction setting information 62 indicates the user ID of the user who has instructed the execution of the function provided by the MFP 20 in the case of the MFP 20 and indicates the user ID of the user who has instructed the execution of the cloud service provided by the cloud server 30 in the case of the cloud server 30.

The ACTION information 70 includes execution operation information 71 that specifically indicates the operation performed by the node in the service execution system 100 according to the input corresponding to the IN information 60. The execution operation information 71 does not include the execution result of the function by the MFP 20 and the execution result of the cloud service by the cloud server 30. The ACTION information 70 is not essential information to grasp the problem and the event occurred in the service execution system 100 and therefore the market log 27b needs not to include the ACTION information 70.

The OUTPUT information 80 includes setting information at execution 81 indicative of the setting when the MFP 20 actually performs the job and when the cloud server 30 actually performs the cloud service based on the setting indicated by the instruction setting information 62; and execution result information 82 indicative of the execution result of the function by the operation performed by the MFP 20 or the execution result of the cloud service performed by the cloud server 30 according to the setting indicated by the setting information at execution 81. As described above, since the Web information reference/setting function is not performed in units of jobs, the OUTPUT information 80 does not include the setting information at execution 81 regarding the Web information reference/setting function. When the OUTPUT information 80 includes the setting information at execution 81, the setting information at execution 81 is included associated with the execution result information 82.

Although not illustrated, the OUTPUT information 80 includes the times and the user IDs associated with the execution result information 82. The time associated with the execution result information 82 indicates the time at which the function provided by the MFP 20 has been terminated in the case of the MFP 20 and indicates the time at which the execution of the cloud service provided by the cloud server 30 has been terminated in the case of the cloud server 30. The user ID associated with the execution result information 82 indicates the user ID of the user who has instructed the execution of the function provided by the MFP 20 in the case of the MFP 20 and indicates the user ID of the user who has instructed the execution of the cloud service provided by the cloud server 30 in the case of the cloud server 30.

The setting information at execution 81 is information indicative of the setting contents to the function when the function provided by the MFP 20 is performed in the case of the MFP 20 and information indicative of the setting contents to the cloud service when the cloud service provided by the cloud server 30 is performed in the case of the cloud server 30. For example, when a plurality of settings input by the user are not actually applicable simultaneously at the execution of the job and the setting input by the user is not applicable at the execution of the job depending on the state of the MFP 20, the control unit 28 in the MFP 20 automatically changes these settings at the execution of the job. That is, the job setting indicated in the instruction setting information 62 is not always applied to the job as it is at the execution of the job. Accordingly, the setting information at execution 81 needs to be acquired separately from the instruction setting information 62.

Figure 11:
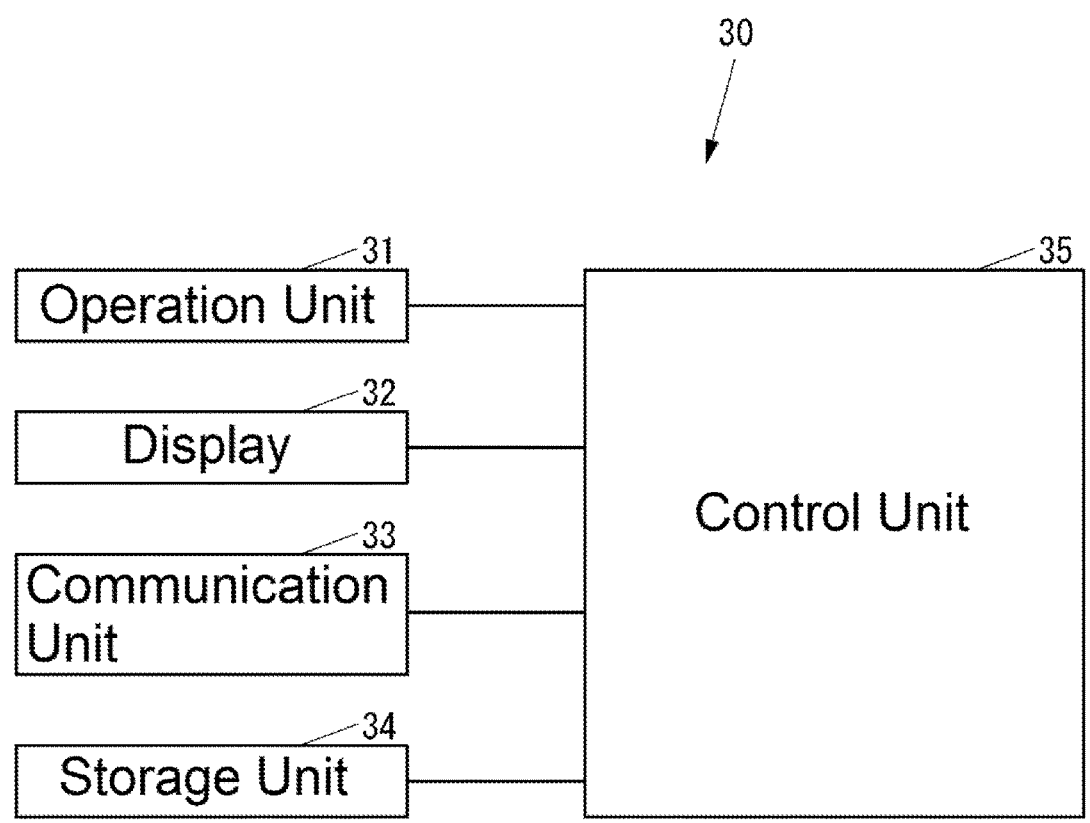
FIG. 11 illustrates a block diagram of a cloud server according to the second embodiment when the cloud server is achieved by one server computer.

FIG. 11 illustrates a block diagram of the cloud server 30 when the cloud server 30 is achieved by one server computer.

The cloud server 30 illustrated in FIG. 11 includes an operation unit 31, a display 32, a communication unit 33, a storage unit 34, and a control unit 35. The operation unit 31 is an input device such as a keyboard and a computer mouse with which various kinds of operations are input. The display 32 is a display device such as a LCD that displays various kinds of information. The communication unit 33 is a communication device for communicating with external devices via a network such as a LAN and the Internet or communicating directly by wired communications or wireless communications without via the network. The storage unit 34 is a non-volatile storage device such as a semiconductor memory and a HDD storing various kinds of information. The control unit 35 controls the entire cloud server 30.

The control unit 35 includes, for example, a CPU, a ROM that stores a program and various data, and a RAM used as a work area of the CPU. The CPU executes the program stored in the ROM or the storage unit 34.

The control unit 35 provides the GUI. The user accesses the GUI via a computer such as a personal computer (PC), thus ensuring inputting an instruction to cause the service execution system 100 to perform the service from the GUI to the cloud server.

The control unit 35 performs the cloud service by a unit referred to as a transaction. Here, when the cloud service is performed by only one process, the transaction of the second embodiment means this process. When the transaction means the process, identification information (hereinafter referred to as a "transaction ID") of the transaction means the identification information (hereinafter referred to as a "process ID") of the process.

Next, the following describes the operations of the service execution system 100.

While the MFP 20 is activated, the market log acquisition unit 28a in the MFP 20 continues to acquire the market logs 27b. Similarly, while the MFP 20 is activated, the development log acquisition unit 28b in the MFP 20 continues to acquire the development logs 27c.

The following describes the operations of the MFP 20 to acquire the market log 27b.

First, the following describes the operations of the MFP 20 when the node execution unit log regarding the MFP 20 itself is acquired.

While the MFP 20 is activated, the market log acquisition unit 28a in the MFP 20 continues to acquire the node execution unit logs.

Figure 12:
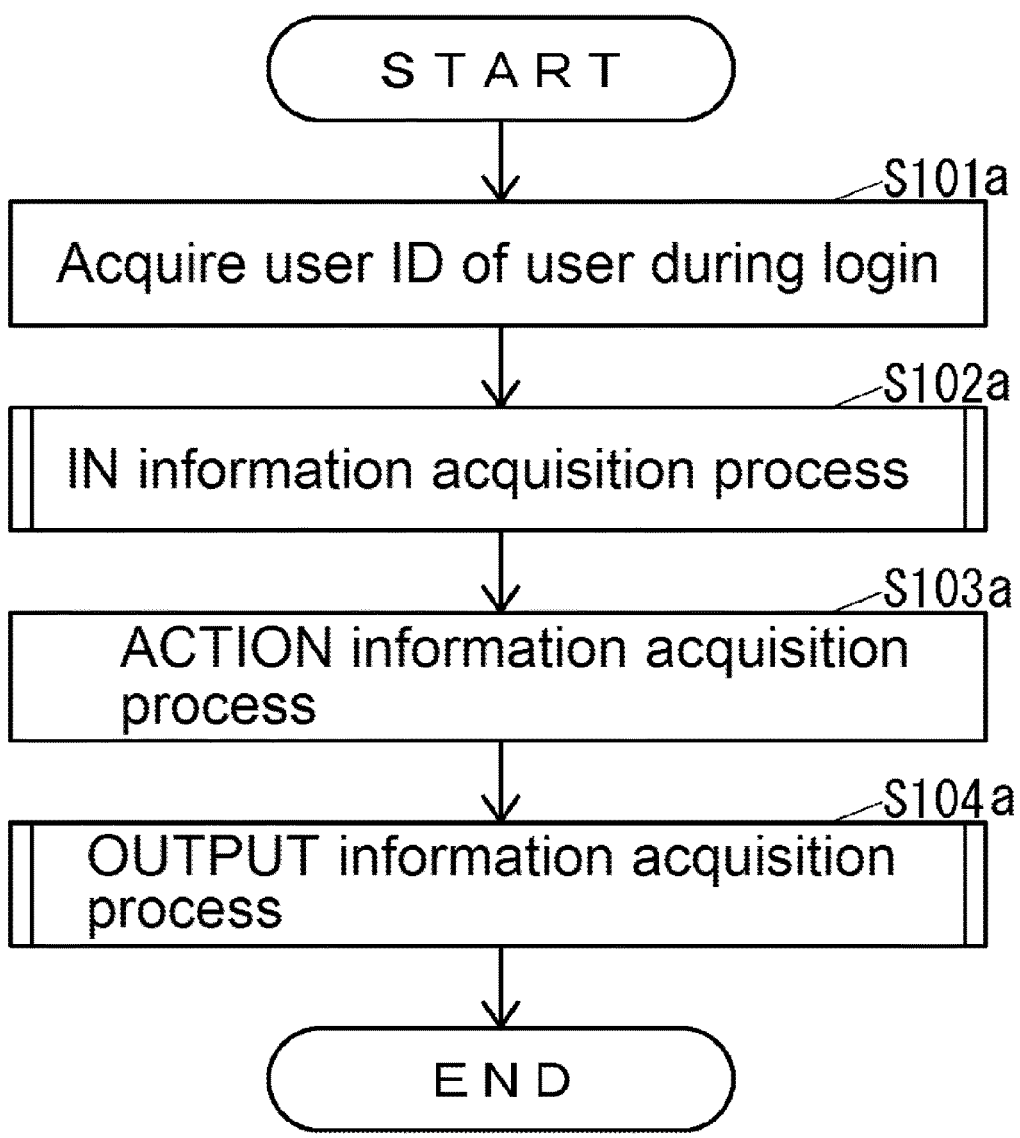
FIG. 12 illustrates operations of the MFP according to the second embodiment to acquire one node execution unit log.

FIG. 12 illustrates the operations of the MFP 20 to acquire the one node execution unit log.

As illustrated in FIG. 12, the market log acquisition unit 28a acquires the user ID of the user during login to the MFP 20 (Step S101a).

Next, the market log acquisition unit 28a performs an IN information acquisition process to acquire the IN information (Step S102a).

Figure 13:
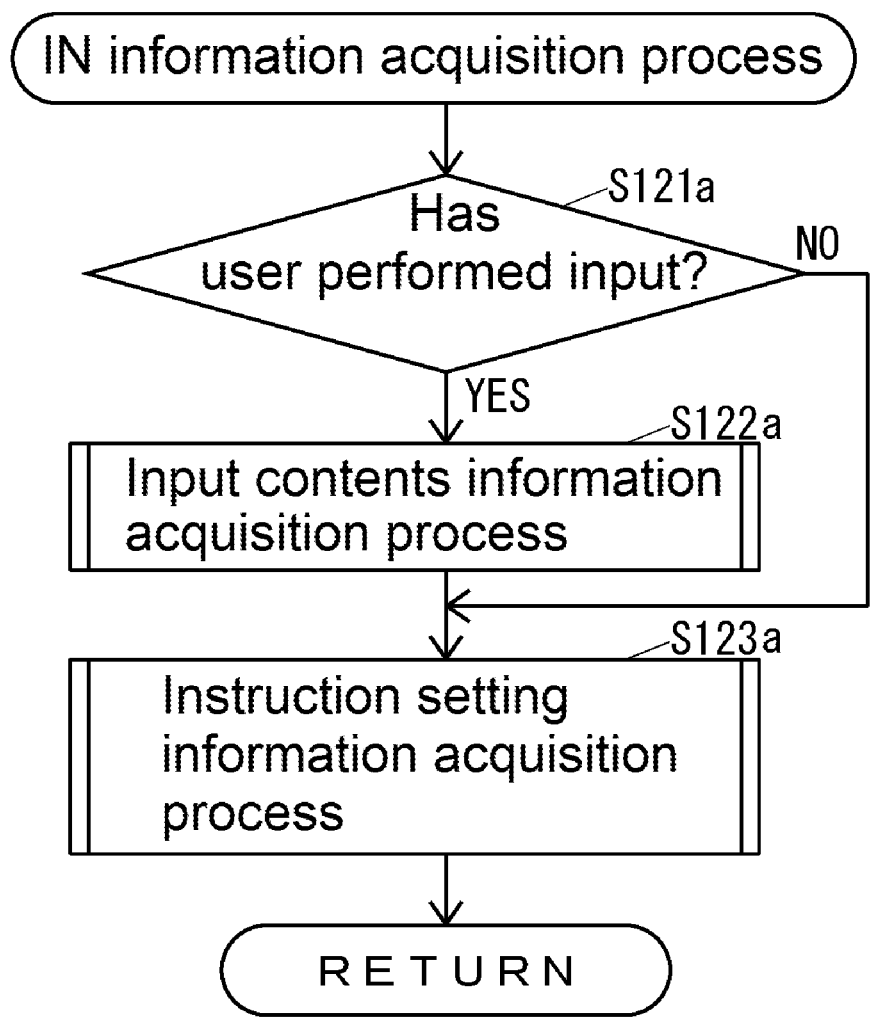
FIG. 13 illustrates an IN information acquisition process according to the second embodiment.

FIG. 13 illustrates the IN information acquisition process illustrated in FIG. 12.

As illustrated in FIG. 13, the market log acquisition unit 28a determines whether the user has performed an input or not (Step S121a).

When the market log acquisition unit 28a determines that the user has performed the input at Step S121a, the market log acquisition unit 28a performs an input contents information acquisition process to acquire the input contents information (Step S122a). Whenever the input is performed to the operation unit 21 or the input via the communication unit 26 is performed, the market log acquisition unit 28a performs the input contents information acquisition process.

Figure 14:
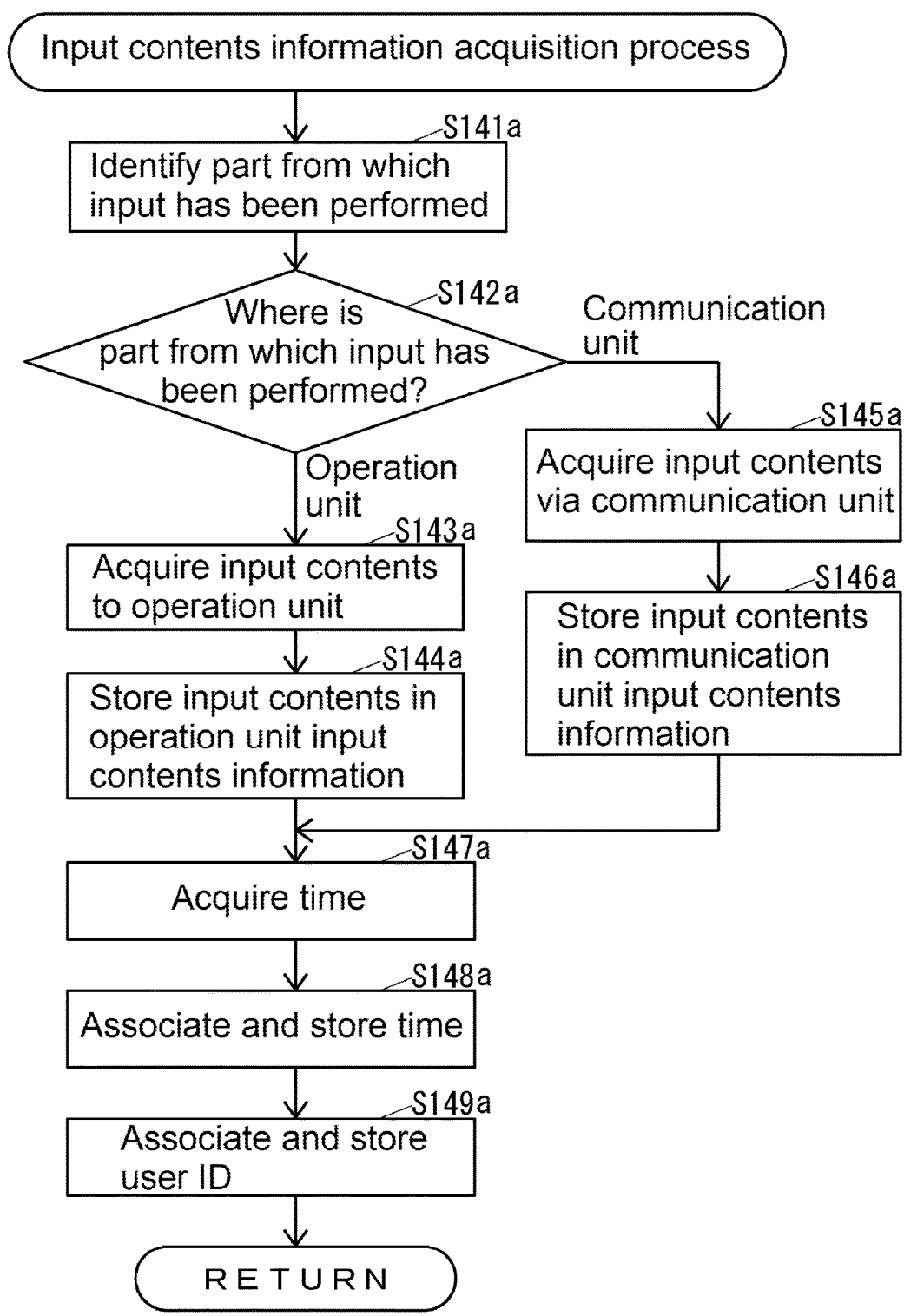
FIG. 14 illustrates an input contents information acquisition process according to the second embodiment.

FIG. 14 illustrates the input contents information acquisition process illustrated in FIG. 13.

As illustrated in FIG. 14, the market log acquisition unit 28a identifies the part from which the input has been performed (Step S141a) to determine the part identified at Step S141a is any of the operation unit 21 and the communication unit 26 (Step S142a).

When the market log acquisition unit 28a determines the part as the operation unit 21 at Step S142a, the market log acquisition unit 28a acquires the input contents to the operation unit 21 (Step S143a) and stores the input contents acquired at Step S143a in the operation unit input contents information (Step S144a).

When the market log acquisition unit 28a determines the part as the communication unit 26 at Step S142a, the market log acquisition unit 28a acquires the input contents via the communication unit 26 (Step S145a) and stores the input contents acquired at Step S145a in the communication unit input contents information (Step S146a).

After the process of Step S144a or S146a, the market log acquisition unit 28a acquires the time at which the input has been performed (Step S147a), associates the time acquired at Step S147a with the input contents stored at Step S144a or S146a, and stores the data (Step S148a).

Next, the market log acquisition unit 28a associates the user ID of the user acquired at Step S101a with the input contents stored at Step S144a or S146a, stores the data (Step S149a), and terminates the input contents information acquisition process illustrated in FIG. 14.

As illustrated in FIG. 13, when the market log acquisition unit 28a determines that the user does not perform the input at Step S121a or the function execution is started after the input contents information acquisition process of Step S122a, the market log acquisition unit 28a performs an instruction setting information acquisition process to acquire the instruction setting information (Step S123a) and terminates the IN information acquisition process illustrated in FIG. 13.

Figure 15:
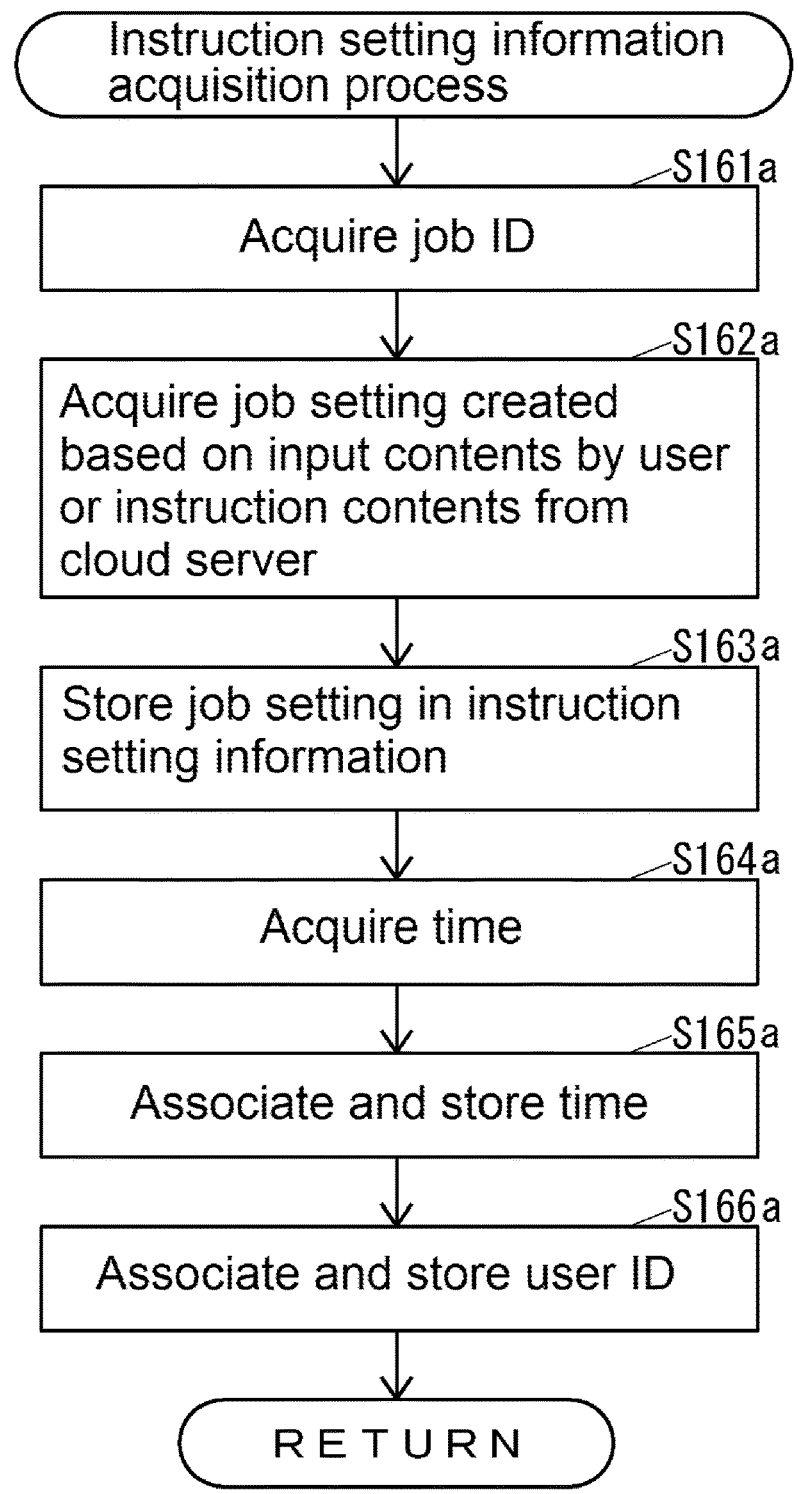
FIG. 15 illustrates an instruction setting information acquisition process according to the second embodiment.

FIG. 15 illustrates the instruction setting information acquisition process illustrated in FIG. 13.

As illustrated in FIG. 15, the market log acquisition unit 28a acquires a job ID as identification information of a target job (Step S161a). Here, the control unit 28 assigns the job IDs mutually different depending on the target jobs at the execution of the jobs to manage the jobs. Accordingly, the market log acquisition unit 28a can use the job IDs assigned for the jobs to acquire the node execution unit log.

The market log acquisition unit 28a acquires a job setting, which is created by the control unit 28 based on any of the input contents to the operation unit 21, the input contents via the communication unit 26, or the instruction contents from the cloud server 30 via the communication unit 26, as the job setting of the job identified by the job ID acquired at Step S161a (Step S162a) and stores the job setting acquired at Step S162a in the instruction setting information (Step S163a).

Next, the market log acquisition unit 28a acquires the time at which the target job has been started (Step S164a), associates the time acquired at Step S164a with the instruction setting information stored at Step S163a, and stores the data (Step S165a).

Next, the market log acquisition unit 28a associates the user ID of the user acquired at Step S101a with the instruction setting information stored at Step S163a and stores the data (Step S166a) and terminates the instruction setting information acquisition process illustrated in FIG. 15.

Based on a combination of the time stored at Step S148a and the user ID stored at Step S149a and a combination of the time stored at Step S165a and the user ID stored at Step S166a, the market log acquisition unit 28a associates the operation unit input contents information stored at Step S144a or the communication unit input contents information stored at Step S146a and the instruction setting information stored at Step S163a as information of the identical node execution unit log.

As illustrated in FIG. 12, after the IN information acquisition process of S102a, the market log acquisition unit 28a performs the ACTION information acquisition process to acquire the ACTION information (Step S103a). In the ACTION information acquisition process, the market log acquisition unit 28a acquires the contents of the operation of the MFP 20 corresponding to the IN information acquired at Step S102a to store the contents in the execution operation information. Next, the market log acquisition unit 28a associates the user ID of the user acquired at Step S101a with the stored execution operation information, stores the data, and terminates the ACTION information acquisition process.

The market log acquisition unit 28a may acquire the job ID as the identification information of the target job and may acquire the contents of the operation of the MFP 20 when the job identified by the acquired job ID is performed as the contents of the operation of the MFP 20 corresponding to the IN information. At this time, the market log acquisition unit 28a associates the instruction setting information stored at Step S163a with the execution operation information stored at the ACTION information acquisition process as the information of the identical node execution unit log based on the job ID acquired at Step S161a and the job ID acquired at the ACTION information acquisition process.

Next, when the execution of the function is terminated, the market log acquisition unit 28a performs an OUTPUT information acquisition process to acquire the OUTPUT information (Step S104a) and terminates the operation illustrated in FIG. 12.

Figure 16:
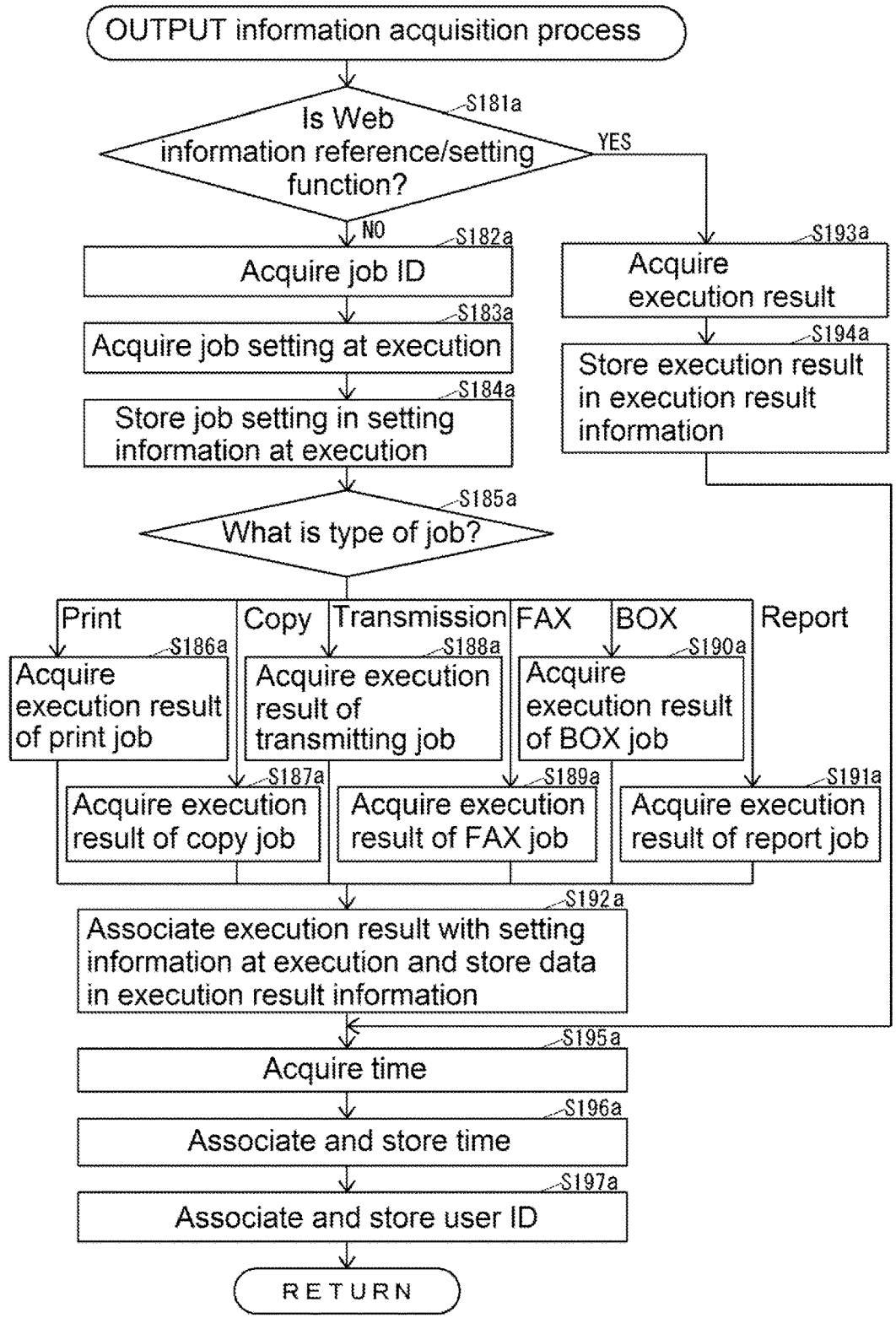
FIG. 16 illustrates an OUTPUT information acquisition process according to the second embodiment.

FIG. 16 illustrates the OUTPUT information acquisition process illustrated in FIG. 12.

As illustrated in FIG. 16, the market log acquisition unit 28a determines whether the function whose execution has been terminated is the Web information reference/setting function or not (Step S181a).

When the market log acquisition unit 28a determines that the function whose execution has been terminated is not the Web information reference/setting function at Step S181a, the market log acquisition unit 28a acquires the job ID as the identification information of the target job (Step S182a).

The market log acquisition unit 28a acquires the job setting when the target job is performed as the job setting of the job identified by the job ID acquired at Step S182a (Step S183a) and stores the job setting acquired at Step S183a in the setting information at execution (Step S184a).

Next, the market log acquisition unit 28a determines the type of the job included in the job setting acquired at Step S183a (Step S185a).

When the market log acquisition unit 28a determines the type as the print job at Step S185a, the market log acquisition unit 28a acquires the execution result of the target print job (Step S186a). Here, the execution result acquired at Step S186a includes, for example, information on whether the target print job has been normally terminated or not, information on the number of sheets of the recording medium printed by the target print job, information on whether the printing by the target print job is any of a monochrome printing and a color printing, and information on whether the printing by the target print job is any of a single-side printing and a duplex printing.

When the market log acquisition unit 28a determines the type as a copy job at Step S185a, the market log acquisition unit 28a acquires the execution result of the target copy job (Step S187a). Here, the execution result acquired at Step S187a includes, for example, information on whether the target copy job has been normally terminated or not, information on the number of sheets of the recording medium printed by the target copy job, information on whether the printing by the target copy job is any of a monochrome printing and a color printing, and information on whether the printing by the target copy job is any of a single-side printing and a duplex printing.

When the market log acquisition unit 28a determines the type as the job of the transmitting function (hereinafter referred to as a "transmitting job") at Step S185a, the market log acquisition unit 28a acquires the execution result of the target transmitting job (Step S188a). Here, the execution result acquired at Step S188a includes, for example, information on whether the target transmitting job has been normally terminated or not, information on a size of data transmitted via the communication unit 26 by the target transmitting job, information on a destination such as the cloud server 30 to which the data has been transmitted via the communication unit 26 by the target transmitting job, and information on the transmitting method of the data by the target transmitting job, such as a transmission by e-mail, a transmission by Server Message Block (SMB), and a transmission by File Transfer Protocol (FTP).

When the market log acquisition unit 28a determines the type as the job of the FAX function (hereinafter referred to as a "FAX job") at Step S185a, the market log acquisition unit 28a acquires the execution result of the target FAX job (Step S189a). Here, the execution result acquired at Step S189a includes, for example, information on whether the target FAX job has been normally terminated or not, information on a size of data transmitted via the fax communication unit 25 by the target FAX job, and information on the destination to which the data has been transmitted via the fax communication unit 25 by the target FAX job.

When the market log acquisition unit 28a determines the type as the job of the BOX function (hereinafter referred to as a "BOX job") at Step S185a, the market log acquisition unit 18a acquires the execution result of the target BOX job (Step S190a). Here, the execution result acquired at Step S190a includes, for example, information on whether the target BOX job has been normally terminated or not and information on a size of data stored in the storage unit 27 by the target BOX job.

When the market log acquisition unit 28a determines the type as the job of the report function (hereinafter referred to as a "report job") at Step S185a, the market log acquisition unit 28a acquires the execution result of the target report job (Step S191a). Here, the execution result acquired at Step S191a includes, for example, information on whether the target report job has been normally terminated or not.

When the process of Step S186a, S187a, S188a, S189a, S190a, or S191a is terminated, the market log acquisition unit 28a associates the execution result acquired at Step S186a, S187a, S188a, S189a, S190a, or S191a with the setting information at execution stored at Step S184a and stores the data in the execution result information (Step S192a).

When the market log acquisition unit 28a determines that the function whose execution has been terminated is the Web information reference/setting function at Step S181a, the market log acquisition unit 28a acquires the execution result of the target Web information reference/setting function (Step S193a) and stores the execution result acquired at Step S193a in the execution result information (Step S194a).

After the process of Step S192a or S194a, the market log acquisition unit 28a acquires the time at which the target function has been terminated (Step S195a), associates the time acquired at Step S195a with the execution result information stored at Step S192a or S194a, and stores the data (Step S196a).

Next, the market log acquisition unit 28a associates the user ID of the user acquired at Step S101a with the execution result information stored at Step S192a or S194a, stores the data, (Step S197a), and terminates the OUTPUT information acquisition process illustrated in FIG. 16.

The market log acquisition unit 28a associates the instruction setting information stored at Step S163a with the execution result information stored at Step S192a as the information of the identical node execution unit log based on the job ID acquired at Step S161a and the job ID acquired at Step S182a.

Next, the following describes the operations of the cloud server 30 when the node execution unit log regarding the cloud server 30 itself is acquired.

While the cloud server 30 is activated, the control unit 35 in the cloud server 30 continues to acquire the node execution unit logs.

Figure 17:
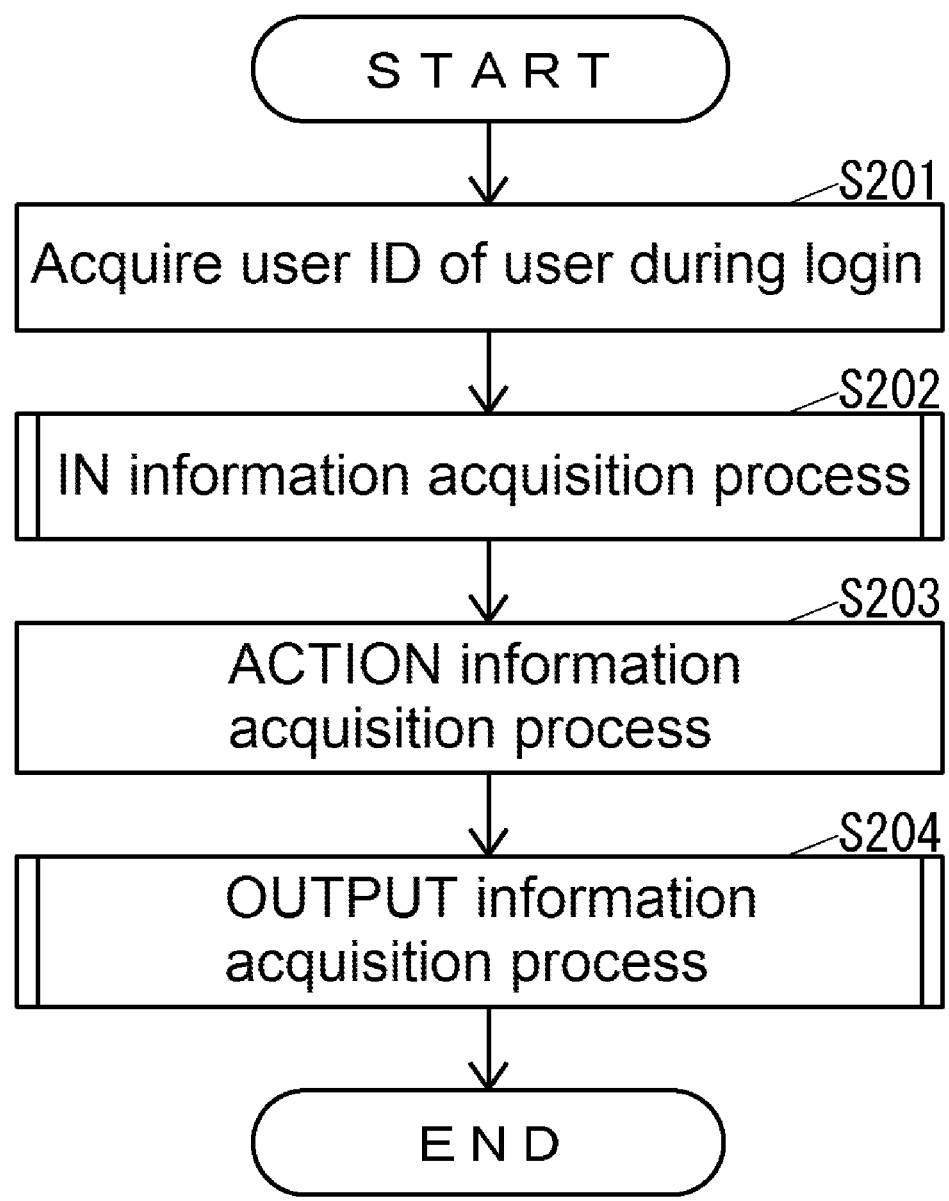
FIG. 17 illustrates operations of the cloud server according to the second embodiment to acquire the one node execution unit log.

FIG. 17 illustrates the operations of the cloud server 30 to acquire the one node execution unit log.

As illustrated in FIG. 17, the control unit 35 acquires the user ID of the user during login to the cloud server 30 (Step S201).

Next, the control unit 35 performs an IN information acquisition process to acquire the IN information (Step S202).

Figure 18:
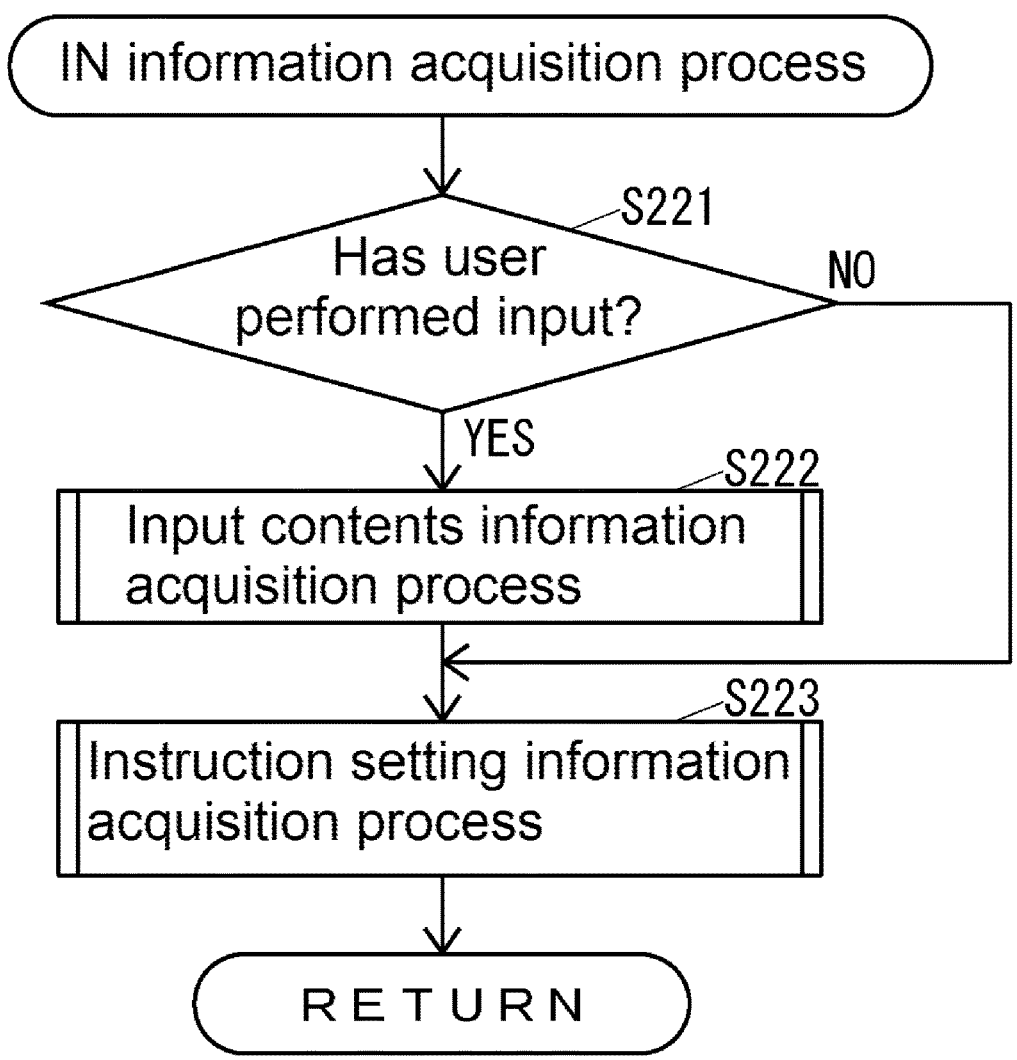
FIG. 18 illustrates the IN information acquisition process illustrated in FIG. 17.

FIG. 18 illustrates the IN information acquisition process illustrated in FIG. 17.

As illustrated in FIG. 18, the control unit 35 determines whether the user has performed an input or not (Step S221).

When the control unit 35 determines that the user has performed the input at Step S221, the control unit 35 performs an input contents information acquisition process to acquire the input contents information (Step S222). Whenever the input is performed to the GUI provided by the cloud server 30, the control unit 35 performs the input contents information acquisition process.

Figure 19:
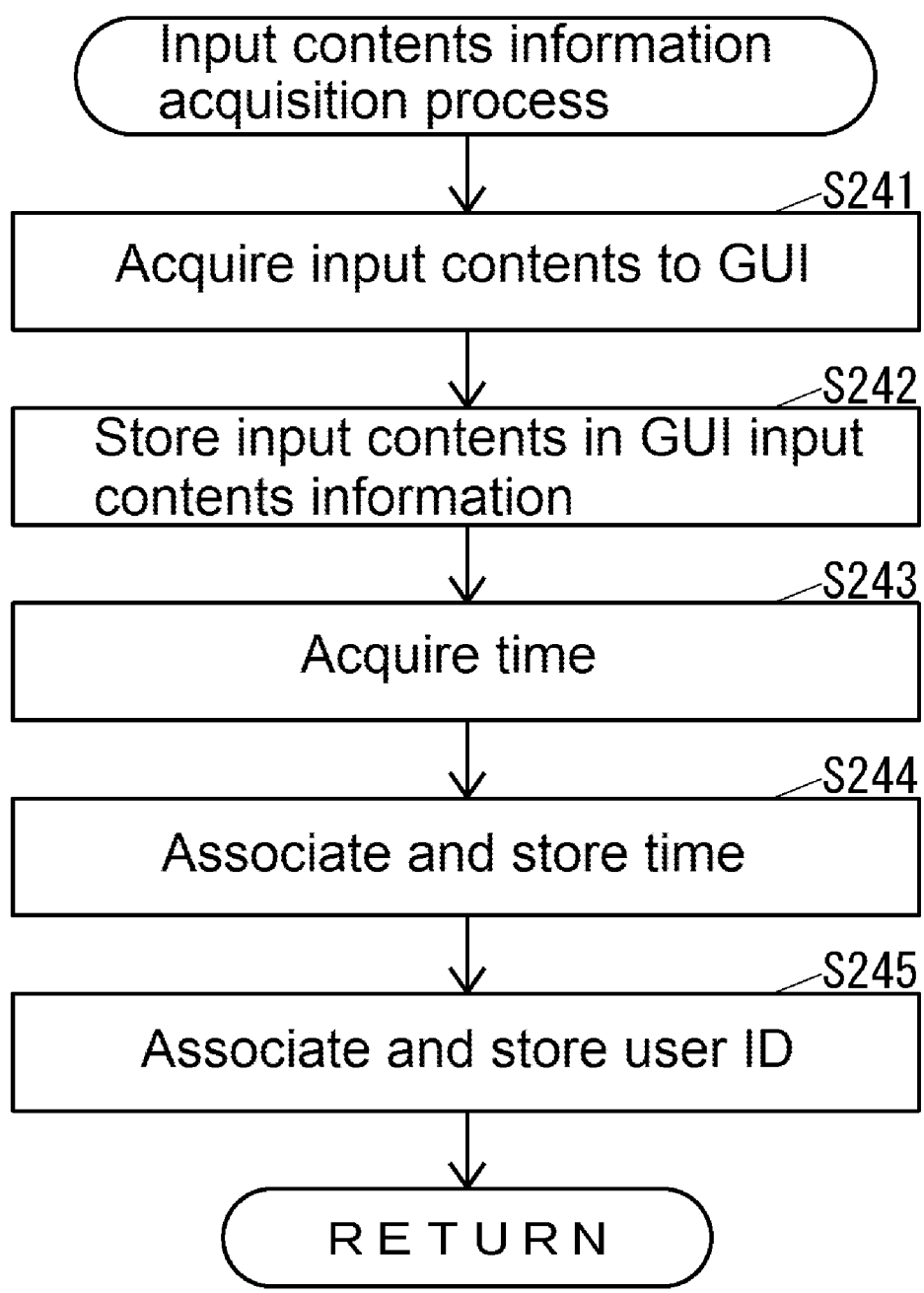
FIG. 19 illustrates the input contents information acquisition process illustrated in FIG. 18.

FIG. 19 illustrates the input contents information acquisition process illustrated in FIG. 18.

As illustrated in FIG. 19, the control unit 35 acquires the input contents to the GUI (Step S241) and stores the input contents acquired at Step S241 in the GUI input contents information (Step S242).

Next, the control unit 35 acquires the time at which the input has been performed (Step S243), associates the time acquired at Step S243 with the input contents stored at Step S242, and stores the data (Step S244).

Next, the control unit 35 associates the user ID of the user acquired at Step S201 with the input contents stored at Step S242, stores the data (Step S245), and terminates the input contents information acquisition process illustrated in FIG. 19.

As illustrated in FIG. 18, when the control unit 35 determines that the user does not perform the input at Step S221 or the execution of the cloud service is started after the input contents information acquisition process of Step S222, the control unit 35 performs an instruction setting information acquisition process to acquire the instruction setting information (Step S223) and terminates the IN information acquisition process illustrated in FIG. 18.

Figure 20:
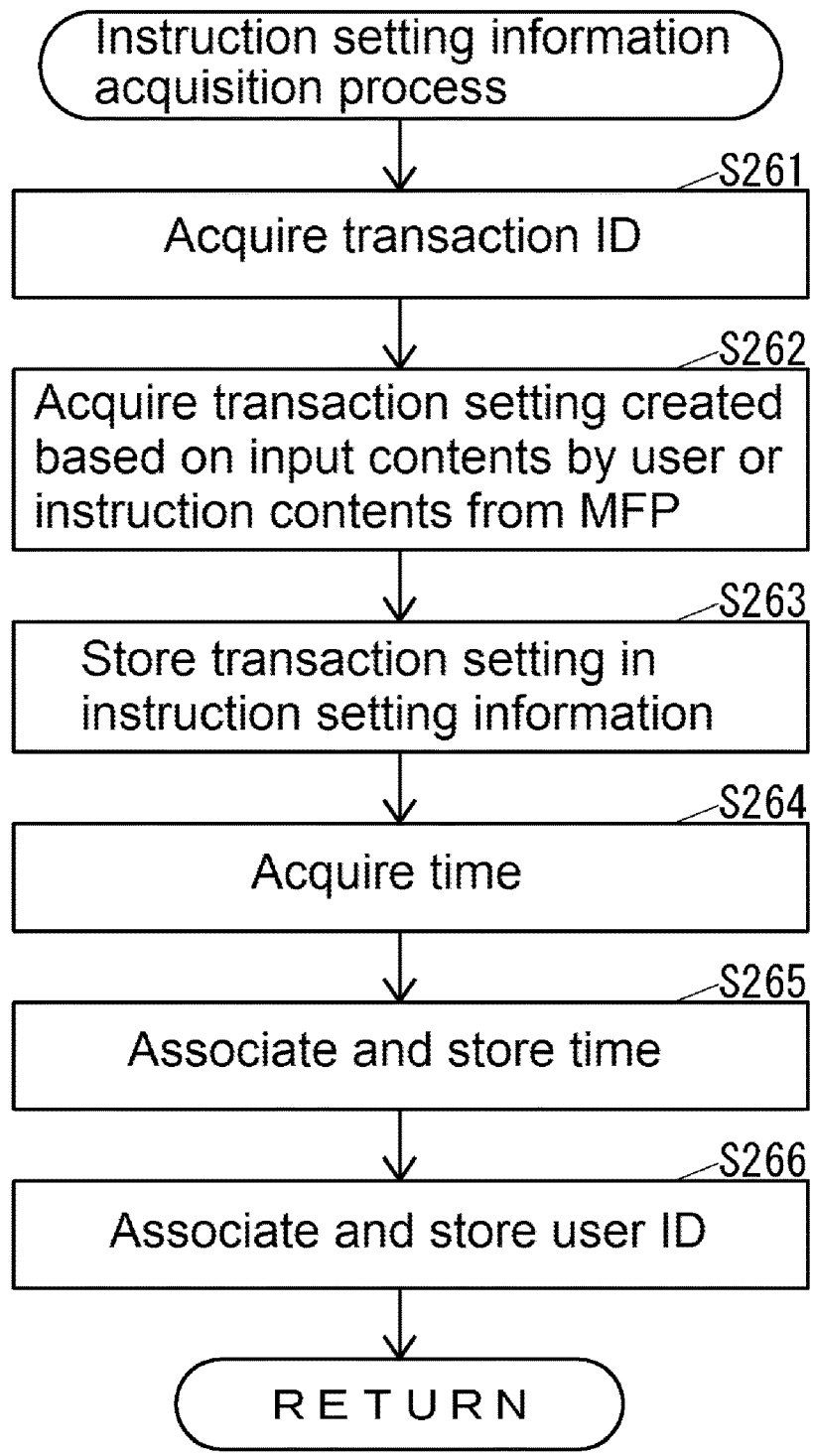
FIG. 20 illustrates the instruction setting information acquisition process illustrated in FIG. 18.

FIG. 20 illustrates the instruction setting information acquisition process illustrated in FIG. 18.

As illustrated in FIG. 20, the control unit 35 acquires a transaction ID as identification information of a target transaction (Step S261). Here, the control unit 35 assigns transaction IDs mutually different depending on the target transactions at the execution of the transactions to manage the transactions. Accordingly, the control unit 35 can use the transaction IDs assigned for the transactions to acquire the node execution unit log.

The control unit 35 acquires the transaction setting created based on any of the input contents to the GUI provided by the cloud server 30 and the instruction contents from the MFP 20 via the communication unit 33 as the setting of the transaction (hereinafter referred to as a "transaction setting") identified by the transaction ID acquired at Step S261 (Step S262) and stores the transaction setting acquired at Step S262 in the instruction setting information (Step S263).

Next, the control unit 35 acquires the time at which the target transaction has been started (Step S264), associates the time acquired at S264 with the instruction setting information stored at Step S263, and stores the data (Step S265).

Next, the control unit 35 associates the user ID of the user acquired at Step S201 with the instruction setting information stored at Step S263, stores the data (Step S266), and terminates the instruction setting information acquisition process illustrated in FIG. 20.

Based on a combination of the time stored at Step S244 and the user ID stored at S245 and a combination of the time stored at Step S265 and the user ID stored at Step S266, the control unit 35 associates the GUI input contents information stored at Step S242 and the instruction setting information stored at Step S263 as information of the identical node execution unit log.

As illustrated in FIG. 17, after the IN information acquisition process of S202, the control unit 35 performs the ACTION information acquisition process to acquire the ACTION information (Step S203). In the ACTION information acquisition process, the control unit 35 acquires the contents of the operation of the cloud server 30 corresponding to the IN information acquired at Step S202 to store the contents in the execution operation information. Next, the control unit 35 associates the user ID of the user acquired at Step S201 with the stored execution operation information, stores the data, and terminates the ACTION information acquisition process.

The control unit 35 may acquire the transaction ID as the identification information of the target transaction and may acquire the contents of the operation of the cloud server 30 when the transaction identified by the acquired transaction ID is performed as the contents of the operation of the cloud server 30 corresponding to the IN information. At this time, the control unit 35 associates the instruction setting information stored at Step S263 with the execution operation information stored at the ACTION information acquisition process as the information of the identical node execution unit log based on the transaction ID acquired at Step S261 and the transaction ID acquired at the ACTION information acquisition process.

Next, when the execution of the target transaction is terminated, the control unit 35 performs an OUTPUT information acquisition process to acquire the OUTPUT information (Step S204) and terminates the operation illustrated in FIG. 17.

Figure 21:
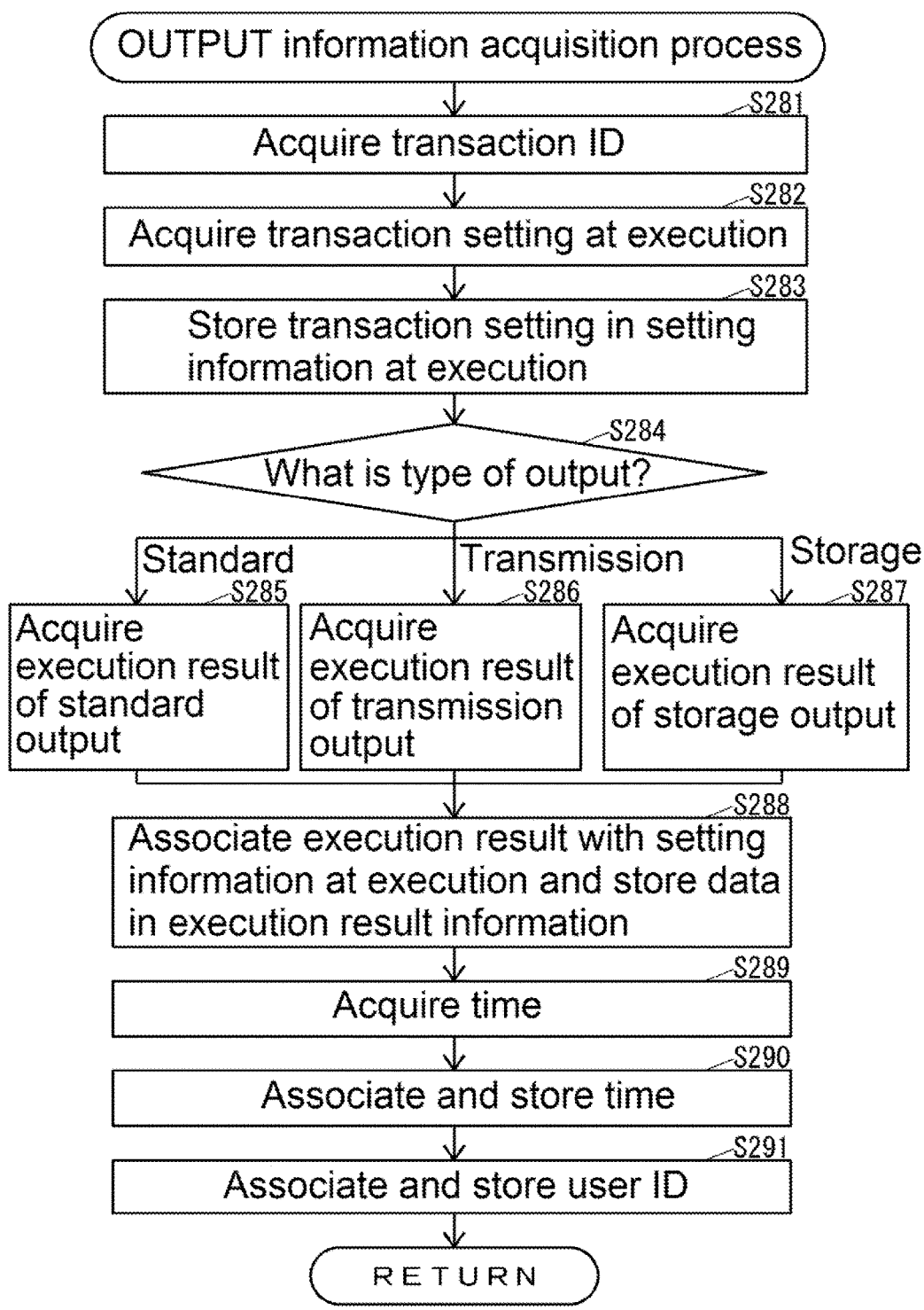
FIG. 21 illustrates the OUTPUT information acquisition process illustrated in FIG. 17.

FIG. 21 illustrates the OUTPUT information acquisition process illustrated in FIG. 17.

As illustrated in FIG. 21, the control unit 35 acquires a transaction ID as identification information of a target transaction (Step S281).

The control unit 35 acquires the transaction setting at the execution of the target transaction as the transaction setting of the transaction identified by the transaction ID acquired at Step S281 (Step S282) and stores the transaction setting acquired at Step S282 in the setting information at execution (Step S283).

Next, the control unit 35 determines the type of the output of the transaction included in the transaction setting acquired at Step S282 (Step S284).

When control unit 35 determines the type as the output to the GUI provided by the cloud server 30 (hereinafter referred to as a "standard output") at Step S284, the control unit 35 acquires the execution result of the target standard output (Step S285). Here, the execution result acquired at Step S285 includes, for example, information whether the target standard output has been normally terminated or not.

When the control unit 35 determines the type as the transmission (hereinafter referred to as a "transmission output") to the node in the service execution system 100 at Step S284, the control unit 35 acquires the execution result of the target transmission output (Step S286). Here, the execution result acquired at Step S286 includes, for example, information on whether the target transmission output has been normally terminated or not, information on a size of data transmitted via the communication unit 33 by the target transmission output, information on a destination such as the MFP 20 to which the data has been transmitted via the communication unit 33 by the target transmission output, and information on the transmitting method of the data by the target transmission output, such as a transmission by e-mail, a transmission by a SMB, and a transmission by a FTP.

When the control unit 35 determines the type as storage (hereinafter referred to as a "storage output") to the storage unit 34 at Step S284, the control unit 35 acquires the execution result of the target storage output (Step S287). Here, the execution result acquired at Step S287 includes, for example, information on whether the target storage output has been normally terminated or not and information on a size of data stored in the storage unit 27 by the target storage output.

When the process of Step S285, S286, or S287 is terminated, the control unit 35 associates the execution result acquired at Step S285, S286, or S287 with the setting information at execution stored at Step S283 and stores the data in the execution result information (Step S288).

After the process of Step S288, the control unit 35 acquires the time at which the target transaction has been terminated (Step S289), associates the time acquired at Step S289 with the execution result information stored at Step S288, and stores the data (Step S290).

Next, the control unit 35 associates the user ID of the user acquired at Step S201 with the execution result information at S288, stores the data (Step S291), and terminates the OUTPUT information acquisition process illustrated in FIG. 21.

The control unit 35 associates the instruction setting information stored at Step S263 with the execution operation information stored at S288 as the information of the identical node execution unit log based on the transaction ID acquired at Step S261 and the transaction ID acquired at Step S281.

Next, the following describes the operations of the MFP 20 to acquire the service unit log.

Figure 22:
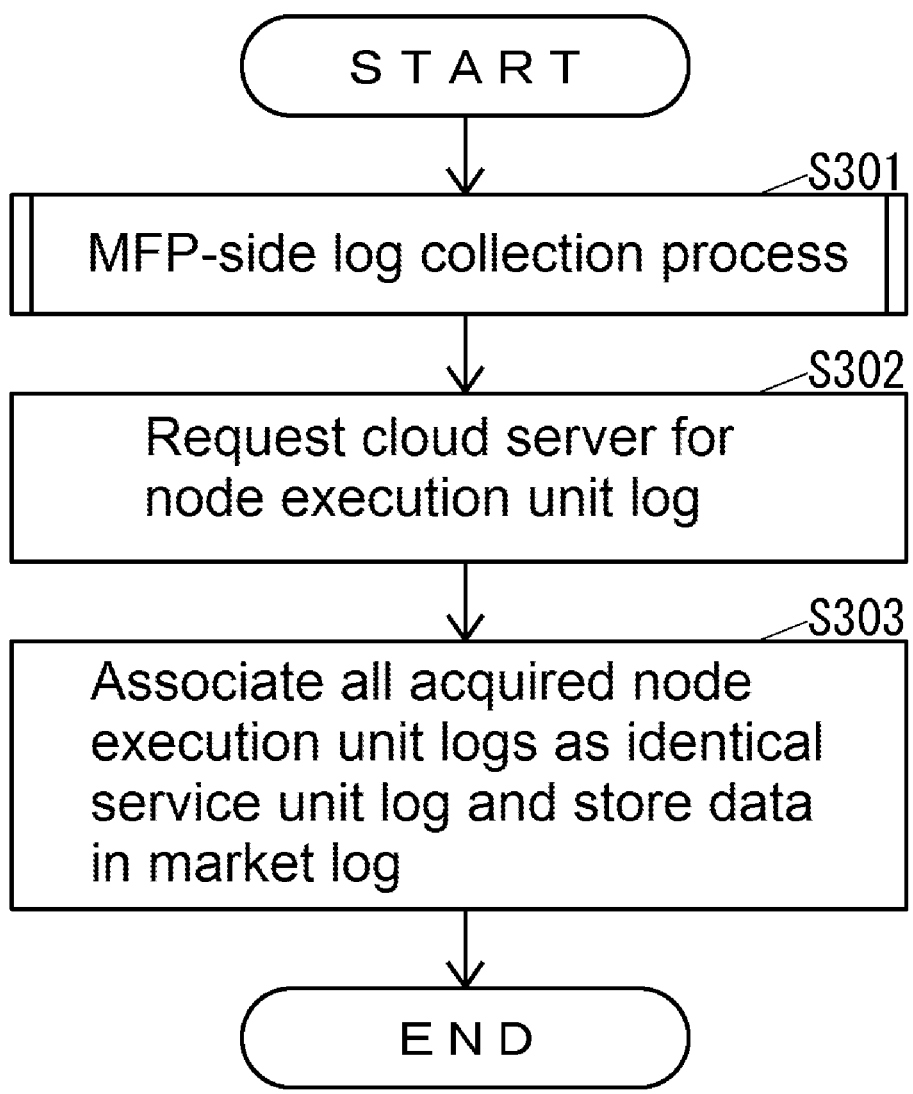
FIG. 22 illustrates operations of the MFP according to the second embodiment to acquire a service unit log.

FIG. 22 illustrates the operations of the MFP 20 to acquire the service unit log.

As illustrated in FIG. 22, the market log acquisition unit 28a performs an MFP-side log collection process to collect the node execution unit logs regarding the MFP 20 among the target service unit logs (Step S301).

Figure 23:
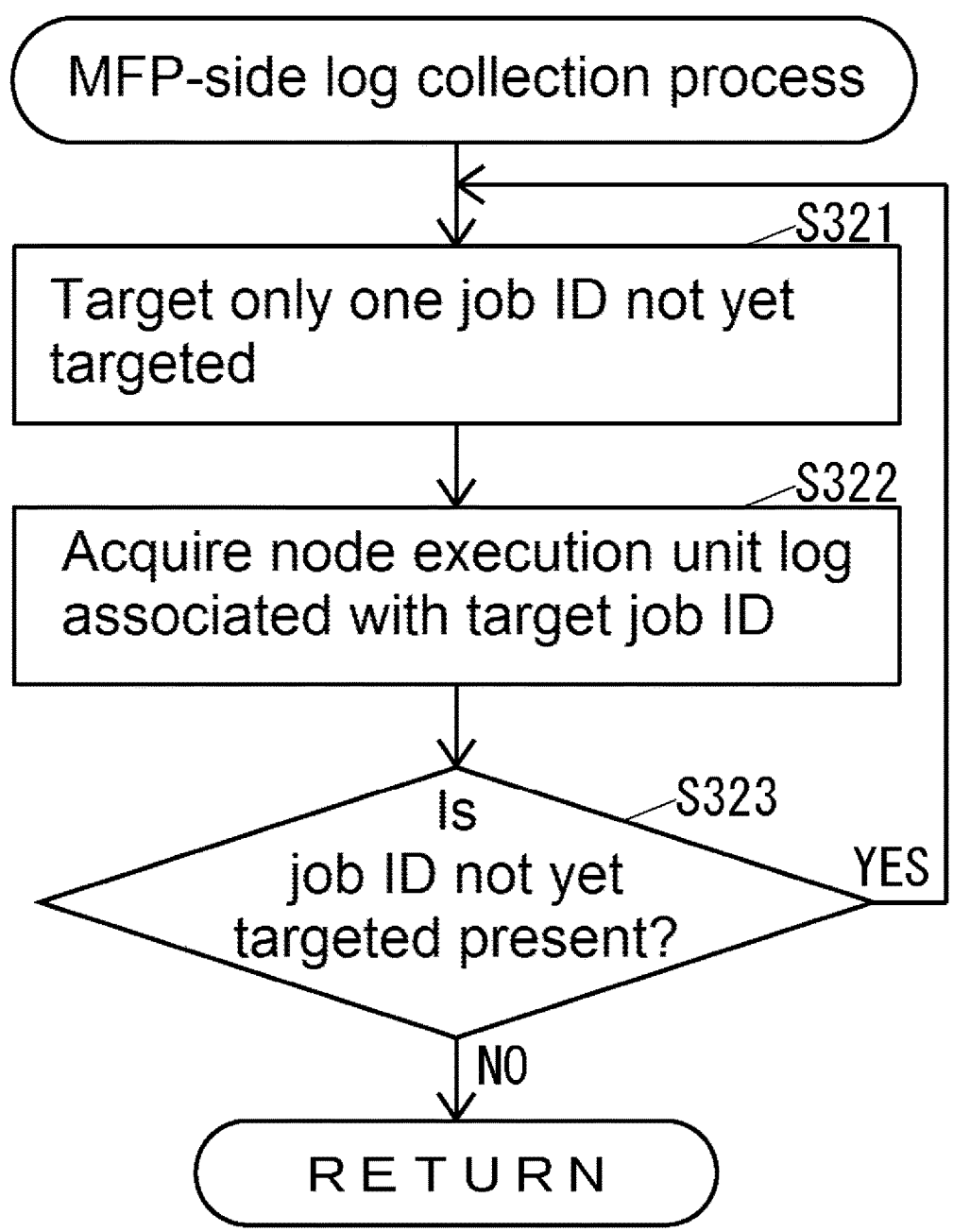
FIG. 23 illustrates an MFP-side log collection process according to the second embodiment.

FIG. 23 illustrates the MFP-side log collection process illustrated in FIG. 22.

As illustrated in FIG. 23, the market log acquisition unit 28a targets only one job ID associated with the target service of the target service unit log not yet targeted (Step S321).

Next, the market log acquisition unit 28a acquires the node execution unit log associated with the target job ID (Step S322).

Next, the market log acquisition unit 28a determines whether the job ID associated with the target service of the target service unit log not yet targeted is present or not (Step S323).

When the market log acquisition unit 28a determines that the job ID not yet targeted is present at Step S323, the market log acquisition unit 28a performs the process of Step S321.

When the market log acquisition unit 28a determines that the job ID not yet targeted is absent at Step S323, the market log acquisition unit 28a terminates the MFP-side log collection process illustrated in FIG. 23.

As illustrated in FIG. 22, after the MFP-side log collection process at Step S301, the market log acquisition unit 28a performs a request of the node execution unit log regarding the cloud server 30 among the target service unit logs to the cloud server 30 (Step S302).

Figure 24:
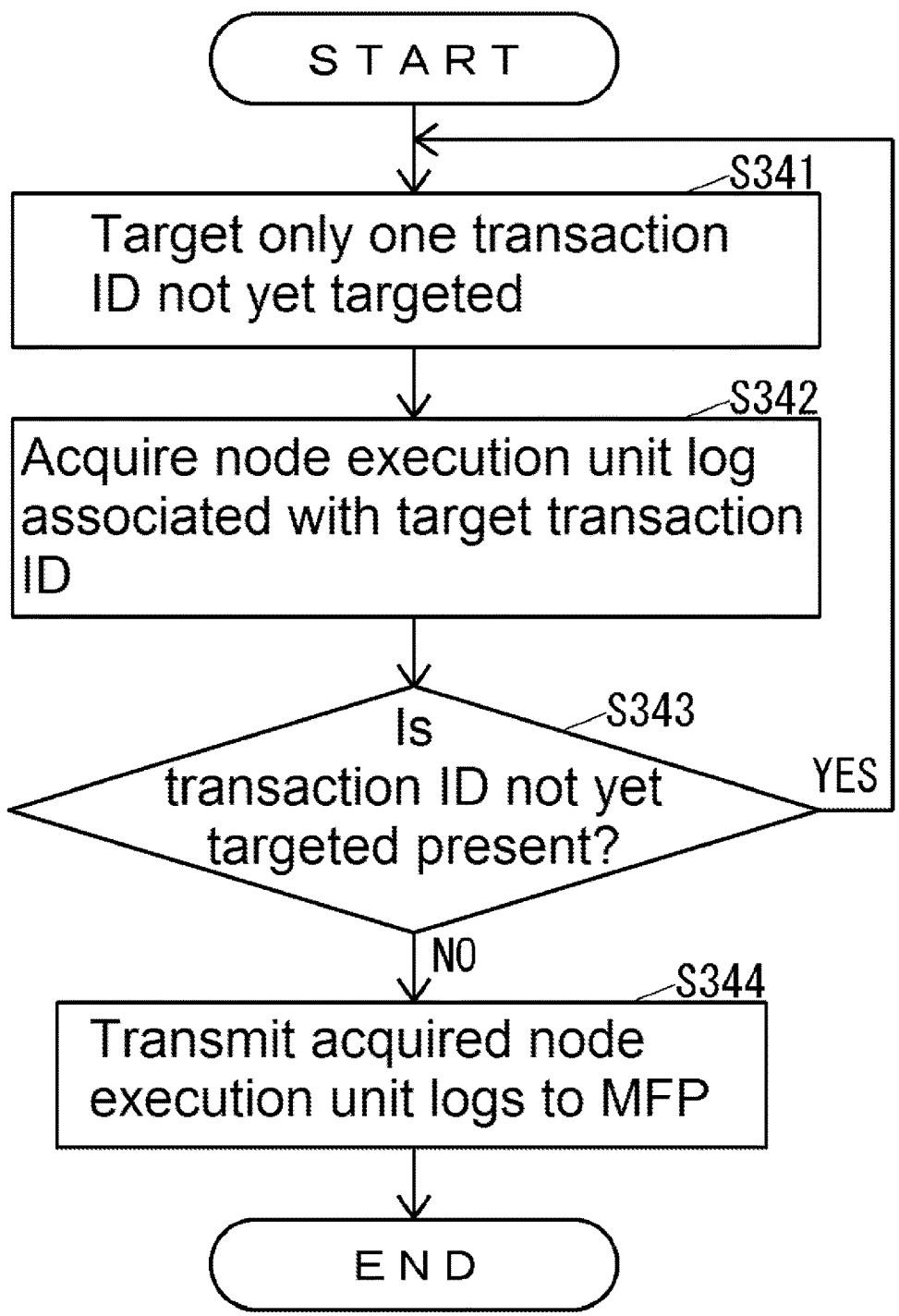
FIG. 24 illustrates operations of the cloud server according to the second embodiment when a request of the node execution unit log is received.

FIG. 24 illustrates the operations of the cloud server 30 when the cloud server 30 receives the request of the node execution unit log.

As illustrated in FIG. 24, the control unit 35 targets only the one transaction ID not yet targeted and associated with the target service of the target service unit log, that is, the service unit log that the cloud server 30 has received the request of the node execution unit log from the MFP 20 (Step S341).

Next, the control unit 35 acquires the node execution unit log associated with the target transaction ID (Step S342).

Next, the control unit 35 determines whether the transaction ID associated with the target service of the target service unit log not yet targeted is present or not (Step S343).

When the control unit 35 determines that the transaction ID not yet targeted is present at Step S343, the control unit 35 performs the process of Step S341.

When the control unit 35 determines that the transaction ID not yet targeted is absent at Step S343, the control unit 35 transmits all node execution unit logs acquired by respective processes at Step S342 performed at the process illustrated in FIG. 24 at this time to the MFP 20 (Step S344) and terminates the operation illustrated in FIG. 24.

As illustrated in FIG. 22, the market log acquisition unit 28a associates all node execution unit logs acquired at the MFP-side log collection process at Step S301 and at the process of Step S302 as the information of the identical service unit log after the process of Step S302, stores the data in the market log 27b (Step S303), and terminates the operations illustrated in FIG. 22.

As described above, the MFP 20 acquires the market log 27b, which includes the contents of the inputs by the user and the execution results of the services according to the inputs by the user with respect to each execution unit of the service. This ensures facilitating understanding of how the service has been performed as the result of operation of what sort of input by the user with the market log 27b. Accordingly, the MFP 20 is configured to enhance assistance for the explanation to the user regarding a defect by a person who does not have a high technical level such as the service person.

When explaining the problem and the event occurred in the service execution system 100 to the customer, the service person can accurately explain the problem and the event to the customer with the IN information and the OUTPUT information in the service unit log in the market log 27b. Especially, since the market log 27b includes the IN information and the OUTPUT information with respect to each execution unit of the service, the service person can grasp the problem and the event occurred in the service execution system 100 regarding the respective services by the service execution system 100.

For example, the service person can determine whether the cause of the execution result of the service by the service execution system 100 failing to produce a result desired by the customer is an improper operation to the service execution system 100 by the customer or not based on the market log 27b.

The MFP 20 is configured to include the contents of the transmission from the node to another node in the node execution unit log (Steps S188a and S286). This ensures facilitating the understanding of the contents transmitted from the node to another node at the execution of the service with the service log. Accordingly, the MFP 20 is configured to enhance assistance for the explanation to the user regarding a defect by a person who does not have a high technical level.

The MFP 20 is configured to include the contents of reception from the node to another node in the node execution unit log (Steps S163a and S263). This ensures facilitating the understanding of the contents received by the node from another node at the execution of the service with the service log. Accordingly, the MFP 20 is configured to enhance assistance for the explanation to the user regarding a defect by a person who does not have a high technical level.

The MFP 20 is configured to include the contents of the transmission from the node to another node in the node execution unit log (Steps S188a and S286) and is configured to include the contents of reception from the node to another node in the node execution unit log (Steps S163a and S263). This ensures facilitating understanding of whether the data is normally transmitted and received between the nodes at the execution of the service or not with the service log.

In the second embodiment, the MFP 20 stores the IN information and the OUTPUT information of all node execution unit logs regarding the identical service in the service unit log. Accordingly, the service person can confirm a flow of processes in the time series manner by the respective nodes regarding the identical service with the market log 27b. However, the MFP 20 may store only the IN information regarding the user input contents and the OUTPUT information regarding the final output of the service in the service unit log among the IN information and the OUTPUT information of all node execution unit logs regarding the identical service.

The MFP 20 includes the instruction setting information and the setting information at execution in the service unit log in the market log 27b. This ensures facilitating understanding of how the setting contents performed to the service by the user have been finally changed at the execution of the service with the market log 27b.

By confirming the market logs 27b, the service person can promptly explain the situation to the customer, namely, the user of the MFP 20 regarding the problem and the event occurred in the service execution system 100, thereby ensuring, for example, a suggestion of an alternate method to the customer. It is important in the market to immediately propose the alternate method to the customer by detailed investigation to determine the cause. The market log 27b is not suitable for the detailed investigation to determine the cause but ensures rough investigation to determine the cause, thereby ensuring the immediate suggestion of the alternate method to the customer.

The following describes an example where the printer 23 does not perform the printing when the customer instructs the service execution system 100 to perform the service of execution of the printing by the printer 23 in the MFP 20 based on the image data stored in the cloud server 30, the service person receives a report that "the printing is not performed" from the customer. When the service person recognizes that the inexecution of the printing is caused by a defect in communications between the MFP 20 and the cloud server 30 through the confirmation of the market log 27b, the service person can promptly explain the situation to the customer. Further, for example, the service person can suggest the alternate method such as "the printing by the printer 23 based on the image data stored in a computer other than the cloud server 30, such as a PC of the customer" to the customer. When the service person recognizes that the inexecution of the printing is caused by a defect in the print function of the MFP 20 through the confirmation of the market log 27b, the service person can promptly explain the situation to the customer. Further, for example, the service person can suggest the alternate method such as "a service using a function other than the print function of the MFP 20" to the customer.

The MFP 20 acquires the development log 27c separately from the market log 27b. Accordingly, the MFP 20 is configured to appropriately assist the explanation to the user regarding a defect by the person who does not have the high technical level such as the service person with the market log 27b and configured to appropriately assist a detailed analysis of the cause of the defect by a person who has a high technical level such as the developer with the development log 27c.

While the MFP 20 is compatible with the print job, the copy job, the transmitting job, the FAX job, the BOX job, and the report job in the second embodiment, the MFP 20 may be compatible with a job of a type other than these jobs. Similarly, while the cloud server 30 is compatible with the standard output, the transmission output, and the storage output, the cloud server 30 may be compatible with an output of a type other than these outputs.

While the service execution system 100 includes the MFP 20 as the node in the second embodiment, the service execution system 100 may include at least another one electronic device as the node instead of the MFP 20 or in addition to the MFP 20. The electronic device included in the service execution system 100 may be an image forming apparatus such as an MFP, a printer-only machine, a copy-only machine, a scanner-only machine, and a FAX-only machine, or may be an electronic device other than the image forming apparatus such as a PC.

While the service execution system 100 includes the cloud server 30 as the node in the second embodiment, the service execution system 100 may include at least another one cloud server as the node in addition to the cloud server 30.

When the service execution system 100 includes a plurality of electronic devices as the respective nodes, the service execution system 100 needs not to include the cloud server as the node. When the service execution system 100 includes a plurality of electronic devices as the respective nodes and does not include the cloud server as the node, the service execution system 100 is a system in which the plurality of electronic devices cooperate with one another to perform the service according to the input by the user. When the service execution system 100 includes only a plurality of MFPs as the respective nodes, the service performed by the service execution system 100 includes, for example: a service that automatically distributes at least one print data among a plurality of print data, which are generated after automatically dividing the print data into the plurality of print data by the MFP when the one MFP included in the service execution system 100 receives the print data from the PC, to another MFP included in the service execution system 100 to dividedly print the one print data by the plurality of MFPs; and a service that transmits image data of an image read from a document by a scanner of one MFP included in the service execution system 100 to an address identified by the user from an address book of an MFP different from this MFP.

The MFP 20 in the second embodiment requests only the cloud server 30 for the node execution unit log at Step S302. However, when the service execution system 100 includes three or more nodes, the MFP 20 requests other all nodes for the node execution unit log.

With the service execution system 100 in the second embodiment, the MFP 20 collects the service unit logs. However, the cloud server 30 may collect the service unit logs of the services achieved by the MFP 20 and the cloud server 30, and, for example, a computer other than the MFP 20 and the cloud server 30, such as a management server to manage the MFP 20, may collect the service unit logs.

Example of Implemented Aspect According to Second Embodiment

The electronic device of the disclosure is an electronic device included as a node in a service execution system in which a plurality of the nodes cooperate with one another to perform a service according to the input by the user. The service execution system includes at least each one of another device as an electronic device other than one's own device as the electronic device and a cloud server as the nodes. One's own device includes a service log acquisition unit that acquires a service log as a market log. The service log includes contents of the input and an execution result of the service with respect to each execution unit of the service.

With this configuration, the electronic device of the disclosure acquires the service log, which includes the contents of the inputs by the user and the execution results of the services according to the inputs by the user with respect to each execution unit of the service. This ensures facilitating understanding of how the service has been performed as the result of operation of what sort of input by the user with the service log. Accordingly, the electronic device of the disclosure is configured to enhance assistance for the explanation to the user regarding a defect by a person who does not have a high technical level.

In the electronic device of the disclosure, the service log may include contents of a transmission to another node by the node.

With this configuration, the electronic device of the disclosure ensures facilitating the understanding of the contents transmitted from the node to another node at the execution of the service with the service log. Accordingly, the electronic device of the disclosure is configured to enhance the assistance for the explanation to the user regarding the defect by the person who does not have the high technical level.

In the electronic device of the disclosure, the service log may include contents of a reception from another node by the node.

With this configuration, the electronic device of the disclosure ensures facilitating the understanding of the contents received from another node by the node at the execution of the service with the service log. Accordingly, the electronic device of the disclosure is configured to enhance the assistance for the explanation to the user regarding the defect by the person who does not have the high technical level.

The electronic device of the disclosure may be configured as follows. The contents of the input include setting contents to the service by the user. The service log includes setting contents to the service when the service is performed, and the setting contents are changed from the setting contents to the service by the user.

With this configuration, the electronic device of the disclosure ensures facilitating understanding of how the setting contents performed to the service by the user have been finally changed at the execution of the service with the service log.

The electronic device of the disclosure may be configured as follows. The electronic device includes a signal log acquisition unit that acquires a signal log. The signal log includes a signal transmitted from software in one's own device to hardware in one's own device, a signal transmitted/received between a plurality of pieces of the software, and a signal received by the software from the hardware.

With this configuration, the electronic device of the disclosure acquires the signal log separately from the signal log. Accordingly, the electronic device is configured to appropriately assist the explanation to the user regarding a defect by the person who does not have the high technical level with the service log and configured to appropriately assist a detailed analysis of the cause of the defect by a person who has a high technical level with the signal log.

A log acquisition program of the disclosure is a log acquisition program performed by an electronic device included as a node in a service execution system in which a plurality of the nodes cooperate with one another to perform a service according to an input by a user. The service execution system includes at least each one of another device as an electronic device other than one's own device as the electronic device and a cloud server as the nodes. The log acquisition program causes one's own device to achieve a service log acquisition unit that acquires a service log as a market log. The service log includes contents of the input and an execution result of the service with respect to each execution unit of the service.

With this configuration, the electronic device that performs the log acquisition program of the disclosure acquires the service log, which includes the contents of the inputs by the user and the execution results of the services according to the inputs by the user with respect to each execution unit of the service. This ensures facilitating understanding of how the service has been performed as the result of operation of what sort of input by the user with the service log. Accordingly, the electronic device that performs the log acquisition program of the disclosure is configured to enhance assistance for the explanation to the user regarding a defect by a person who does not have a high technical level.

A service execution system of the disclosure is a service execution system in which a plurality of nodes cooperate with one another to perform a service according to an input by a user. The service execution system includes an electronic device as the node. The service execution system includes at least each one of an electronic device other than the electronic device and a cloud server as the nodes. The service execution system includes a service log acquisition unit that acquires a service log as a market log. The service log includes contents of the input and an execution result of the service with respect to each execution unit of the service.

With this configuration, the service execution system of the disclosure acquires the service log, which includes the contents of the inputs by the user and the execution results of the services according to the inputs by the user with respect to each execution unit of the service. This ensures facilitating understanding of how the service has been performed as the result of operation of what sort of input by the user with the service log. Accordingly, the service execution system of the disclosure is configured to enhance assistance for the explanation to the user regarding a defect by a person who does not have a high technical level.

A log acquisition method of the disclosure is a log acquisition method by a service execution system in which a plurality of nodes cooperate with one another to perform a service according to an input by a user. The service execution system includes the electronic device as the node. The service execution system includes at least each one of an electronic device other than the electronic device and a cloud server as the nodes. The log acquisition method includes a service log acquisition step that acquires a service log as a market log. The service log includes contents of the input and an execution result of the service with respect to each execution unit of the service.

With this configuration, the log acquisition method of the disclosure acquires the service log, which includes the contents of the inputs by the user and the execution results of the services according to the inputs by the user with respect to each execution unit of the service. This ensures facilitating understanding of how the service has been performed as the result of operation of what sort of input by the user with the service log. Accordingly, the log acquisition method of the disclosure is configured to enhance assistance for the explanation to the user regarding a defect by a person who does not have a high technical level.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device that performs a function according to an input by a user, the electronic device comprising:
    a market log acquisition unit that acquires a market log,
    a signal log acquisition unit that acquires a signal log, the signal log including a signal transmitted from software to hardware in the electronic device, a signal transmitted/received between a plurality of pieces of the software, and a signal received by the software from the hardware, and
    a storage unit, wherein
    the electronic device is included as a node in a service execution system in which a plurality of the nodes cooperate with one another to perform a service according to the input by the user,
    the service execution system includes, as nodes in the plurality of nodes, respectively at least one of another device as an electronic device other than one's own device as the electronic device, and a cloud server,
    the market log acquisition unit in one's own device acquires a service log as the market log, the service log including, with respect to each execution unit of the service, a service unit log including a node execution unit log including contents of the input for each node in the plurality of nodes and an execution result of a process based on the function, with respect to each execution unit of the process based on the function,
    the signal log acquisition unit acquires the signal log as a development log, the signal log being acquired separately from the service log, and
    the storage unit stores the market log and the development log, the market log and the development log being stored separately with each other in the storage unit.

2. The electronic device according to claim 1, wherein:
    the contents of the input include setting contents to the function by the user; and
    the market log includes the setting contents to the function at an execution of the function.

3. The electronic device according to claim 1, wherein the service log includes contents of a transmission to another node by a node in the plurality of nodes.

4. The electronic device according to claim 1, wherein the service log includes contents of a reception from another node by a node in the plurality of nodes.

5. The electronic device according to claim 1, wherein:
    the contents of the input include setting contents to the service by the user; and the service log includes the setting contents to the service when the service is performed, the setting contents being changed from the setting contents to the service by the user.

6. The electronic device according to claim 1, further comprising:
a signal log acquisition unit that acquires a signal log, the signal log including a signal transmitted from software in one's own device to hardware in one's own device, a signal transmitted/received between a plurality of pieces of the software, and a signal received by the software from the hardware.

7. A service execution system in which a plurality of nodes cooperate with one another to perform a service according to an input by a user, the service execution system comprising:
an electronic device as a node in the plurality of nodes;
at least each one of an electronic device other than the electronic device and a cloud server as nodes in the plurality of nodes;
a market log acquisition unit that acquires a market log,
a signal log acquisition unit that acquires a signal log, the signal log including a signal transmitted from software to hardware in the electronic device, a signal transmitted/received between a plurality of pieces of the software, and a signal received by the software from the hardware, and
a storage unit, wherein
the market log acquisition unit in one's own device acquires a service log as the market log, the service log including, with respect to each execution unit of the service, a service unit log including a node execution unit log including contents of the input for each node in the plurality of nodes and an execution result of a process based on the function, with respect to each execution unit of the process based on the function,
the signal log acquisition unit acquires the signal log as a development log, the signal log being acquired separately from the service log, and
the storage unit stores the market log and the development log, the market log and the development log being stored separately with each other in the storage unit.

8. A market log acquisition method comprising:
acquiring a market log including contents of an input to an electronic device by a user and an execution result of a process based on a function by the electronic device according to the input with respect to each execution unit of the process based on the function,
acquiring a signal log as a development log, the signal log being acquired separately from the service log, the signal log including a signal transmitted from software to hardware in the electronic device, a signal transmitted/received between a plurality of pieces of the software, and a signal received by the software from the hardware, and
storing the market log and the development log in a storage unit, the market log and the development log being stored separately with each other in the storage unit.

9. The market log acquisition method according to claim 8, wherein:
the market log acquisition method employs a service execution system in which a plurality of nodes cooperate with one another to perform a service according to an input by a user;
the service execution system includes the electronic device as the node;
the service execution system includes at least each one of an electronic device other than the electronic device and a cloud server as nodes in the plurality of nodes; and
the market log acquisition method acquires a service log as the market log, the service log including the contents of the input for each node in the plurality of nodes and, with respect to each execution unit of the service, a service unit log including a node execution unit log including an execution result of a process based on the function with respect to each execution unit of the process based on the function.

* * * * *